(12) United States Patent
Parasnis et al.

(10) Patent No.: US 10,908,822 B2
(45) Date of Patent: Feb. 2, 2021

(54) LIMITING BANDWIDTH USAGE ON ASYNCHRONOUS REPLICATION SESSIONS FOR A DESTINATION STORAGE SYSTEM

(71) Applicant: EMC IP Holding Company LLC, Hopkinton, MA (US)

(72) Inventors: Archana Parasnis, Shrewsbury, MA (US); William R. Stronge, Westford, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 61 days.

(21) Appl. No.: 16/456,603

(22) Filed: Jun. 28, 2019

(65) Prior Publication Data

US 2020/0409563 A1    Dec. 31, 2020

(51) Int. Cl.
*G06F 3/00* (2006.01)
*G06F 3/06* (2006.01)

(52) U.S. Cl.
CPC ............ *G06F 3/0613* (2013.01); *G06F 3/065* (2013.01); *G06F 3/067* (2013.01); *G06F 3/0644* (2013.01)

(58) Field of Classification Search
None
See application file for complete search history.

(56) References Cited

U.S. PATENT DOCUMENTS

| | | | |
|---|---|---|---|
| 7,453,804 B1 | 11/2008 | Feroz et al. | |
| 7,765,187 B2 | 7/2010 | Bergant et al. | |
| 7,783,779 B1 | 8/2010 | Scales et al. | |
| 8,706,833 B1 | 4/2014 | Bergant et al. | |
| 9,104,326 B2 | 8/2015 | Frank et al. | |
| 9,208,162 B1 | 12/2015 | Hallak et al. | |
| 9,860,317 B1 | 1/2018 | Gupta | |
| 9,983,958 B2 | 5/2018 | Bhat et al. | |
| 10,776,015 B1* | 9/2020 | Parasnis | G06F 3/0689 |
| 2017/0013057 A1* | 1/2017 | Shani | G06F 3/0619 |
| 2017/0324678 A1 | 11/2017 | Li | |
| 2020/0042631 A1 | 2/2020 | Ward et al. | |

OTHER PUBLICATIONS

U.S. Appl. No. 16/453,132, filed Jun. 26, 2019, Parasnis, et al.
Notice of Allowance and Issue fee due for U.S. Appl. No. 16/453,132, dated Jul. 22, 2020, 13 pages.

* cited by examiner

*Primary Examiner* — Midys Rojas
(74) *Attorney, Agent, or Firm* — Daly, Crowley Mofford & Durkee, LLP

(57) ABSTRACT

An aspect of implementing bandwidth limits on replication sessions for a destination includes creating a list of routing modules having ownership of links going to the destination, calculating, by control modules, a proportionate share of a requested total bandwidth limit based on a number of slices owned and the number of routing modules. The proportionate share of the bandwidth limit is indicated by a budget value of a budget byte window (BBW). An aspect further includes prior to initiating a scan of the slices, identifying a BBW having a budget value equal or greater than the value, allocating the budget value to a thread, and reducing the budget value of the BBW by the predetermined value. An aspect also includes scanning the slices corresponding to the identified BBW, sending a number of bytes transmitted and corresponding number of pages to respective control modules resulting from the scanning, and updating corresponding BBW.

20 Claims, 11 Drawing Sheets

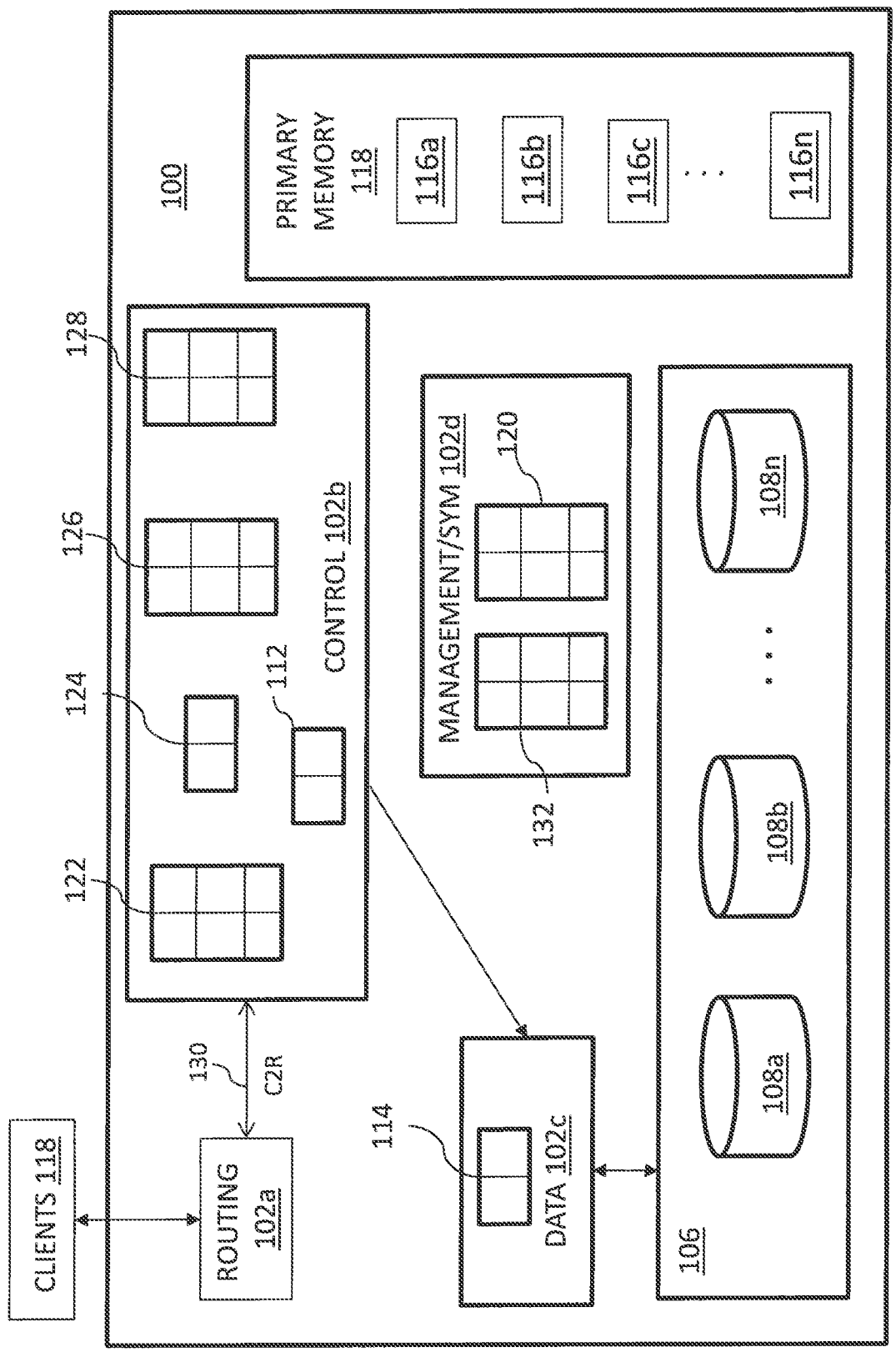

LIMITING BANDWIDTH USAGE ON ASYNCHRONOUS REPLICATION SESSIONS FOR A DESTINATION STORAGE SYSTEM

FIELD

This application relates at least generally to devices, systems, and methods for data storage and data processing in computer systems. More particularly, this application relates at least to ways to improve efficiency of asynchronous replication in a storage system.

BACKGROUND

Computer data is vital to today's organizations, and content addressable storage systems (such as DELL EMC XTREMIO) (hereinafter "XtremIO") can support a rich set of advanced data services such as single data instance, compression, snapshots, etc., by decoupling storage access, logical volume address space, and physical on-disk location of data. In systems such as this, volume and physical layout metadata can offer tremendous flexibility in decoupling and virtualization. Logical volume metadata used with these systems can provide flexible mapping from logical address to data content references, also known as a hash handle. The logical volume metadata also can make snapshot and single instance storage operations highly efficient.

In network environments where high-availability is a necessity, system administrators are constantly faced with the challenges of preserving data integrity and ensuring availability of critical system components, such as data systems and file systems. A significant part of protection of computer data against disasters is focused on data protection and on providing ways for computer systems to recover from disasters and other disruptions. Storage systems sometimes experience failures. For example, a storage device, such as a disk drive, may malfunction making the data stored therein inaccessible (at least temporarily). In addition, data and/or metadata stored on a storage system, or used by a storage system, may become corrupted. To protect against data loss as result of data and/or metadata corruption, file system corruption, and/or hardware failure, storage systems frequently use one or more protection strategies, such as mirroring and use of RAID (Redundant Array of Independent Disks), by taking systems offline to run diagnostic tools, perform manual corrections, etc.

In asynchronous replication sessions, data at a source cluster is replicated asynchronously to a target cluster. With multiple sessions replicating data from the source cluster to the target cluster, sessions compete for available resources, such as network bandwidth. Some sessions may proceed more aggressively than others. The sessions that share the same port with the aggressive sessions may lag on the recovery point objective (RPO) since they are not getting enough bandwidth to transfer their data.

SUMMARY

This Summary is provided to introduce a selection of concepts in a simplified form, to provide a basic understanding of one or more embodiments that are further described below in the Detailed Description. This Summary is not intended to identify key features or essential features of the claimed subject matter, nor is it intended to be used to limit the scope of the claimed subject matter.

In certain embodiments, a method for implementing bandwidth control on asynchronous replication sessions for a destination storage system is provided. The method includes receiving a request to set a bandwidth limit on replication sessions for the destination storage system, updating, by a system manager of the destination storage system, a remote system object with a value representing the bandwidth limit, creating a list of routing modules having ownership of each of a plurality of links going to the destination storage system, and sending, by the system manager, a value representing a maximum bandwidth per link to each of a plurality of control modules of the storage system. The method also includes calculating, by each of the control modules, a proportionate share of the bandwidth limit based on a number of slices owned by each of the control modules. The proportionate share of the bandwidth limit is calculated by dividing the maximum bandwidth limit per link by a number of the plurality of control modules, where the proportionate share of the bandwidth limit is indicated by a budget value in a budget byte window for each of the routing modules corresponding to a respective control module. Prior to initiating a scan of the slices by an initiator thread with respect to a selected routing module, the method includes identifying a corresponding budget byte window having a budget value equal to or exceeding a predetermined value, allocating the budget value for the budget byte window to the initiator thread, and reducing the budget value corresponding to the budget byte window by the predetermined value. The method further includes initiating, by the routing module, the initiator thread for slices corresponding to the identified budget byte window. The initiator thread scans the slices. The method also includes sending, by the routing module, values representing a number of bytes transmitted and corresponding number of pages to the respective control module resulting from the scanning, and updating, by the control module, the corresponding budget byte window based on the values sent by the routing module.

In certain embodiments, a system for implementing bandwidth control on asynchronous replication sessions for a destination storage system is provided. The system includes a memory comprising computer-executable instructions and a processor executing the computer-executable instructions, the computer-executable instructions when executed by the processor cause the processor to perform operations. The operations include receiving a request to set a bandwidth limit on replication sessions for the destination storage system, updating, by a system manager of the destination storage system, a remote system object with a value representing the bandwidth limit, creating a list of routing modules having ownership of each of a plurality of links going to the destination storage system, and sending, by the system manager, a value representing a maximum bandwidth per link to each of a plurality of control modules of the storage system. The operations also include calculating, by each of the control modules, a proportionate share of the bandwidth limit based on a number of slices owned by each of the control modules. The proportionate share of the bandwidth limit is calculated by dividing the maximum bandwidth limit per link by a number of the plurality of control modules, where the proportionate share of the bandwidth limit is indicated by a budget value in a budget byte window for each of the routing modules corresponding to a respective control module. Prior to initiating a scan of the slices by an initiator thread with respect to a selected routing module, the operations include identifying a corresponding budget byte window having a budget value equal to or exceeding a predetermined value, allocating the budget value for the budget byte window to the initiator thread, and reducing the budget value corresponding to the budget byte window by the predetermined value. The operations also include initiating, by the routing module, the initiator thread for slices corresponding to the identified budget byte window. The initiator thread scans the slices. The operations further include sending, by the routing module, values representing a number of bytes transmitted and corresponding number of pages to the respective control module resulting from the scanning, and updating, by the control module, the corresponding budget byte window based on the values sent by the routing module.

In certain embodiments, a computer program product for implementing bandwidth control on asynchronous replication sessions for a destination storage system is provided. The computer program product is embodied on a non-transitory computer readable storage medium, and the computer program product includes instructions that, when executed by a computer causes the computer to perform operations. The operations include receiving a request to set a bandwidth limit on replication sessions for the destination storage system, updating, by a system manager of the destination storage system, a remote system object with a value representing the bandwidth limit, creating a list of routing modules having ownership of each of a plurality of links going to the destination storage system, and sending, by the system manager, a value representing a maximum bandwidth per link to each of a plurality of control modules of the storage system. The operations also include calculating, by each of the control modules, a proportionate share of the bandwidth limit based on a number of slices owned by each of the control modules. The proportionate share of the bandwidth limit is calculated by dividing the maximum bandwidth limit per link by a number of the plurality of control modules, where the proportionate share of the bandwidth limit is indicated by a budget value in a budget byte window for each of the routing modules corresponding to a respective control module. Prior to initiating a scan of the slices by an initiator thread with respect to a selected routing module, the operations include identifying a corresponding budget byte window having a budget value equal to or exceeding a predetermined value, allocating the budget value for the budget byte window to the initiator thread, and reducing the budget value corresponding to the budget byte window by the predetermined value. The operations also include initiating, by the routing module, the initiator thread for slices corresponding to the identified budget byte window. The initiator thread scans the slices. The operations further include sending, by the routing module, values representing a number of bytes transmitted and corresponding number of pages to the respective control module resulting from the scanning, and updating, by the control module, the corresponding budget byte window based on the values sent by the routing module.

Details relating to these and other embodiments are described more fully herein.

BRIEF DESCRIPTION OF THE DRAWING FIGURES

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

FIG. 1C is a simplified block diagram showing a portion of a storage system in accordance with at least one illustrative embodiment of the disclosure;

DETAILED DESCRIPTION

Figure 1A:
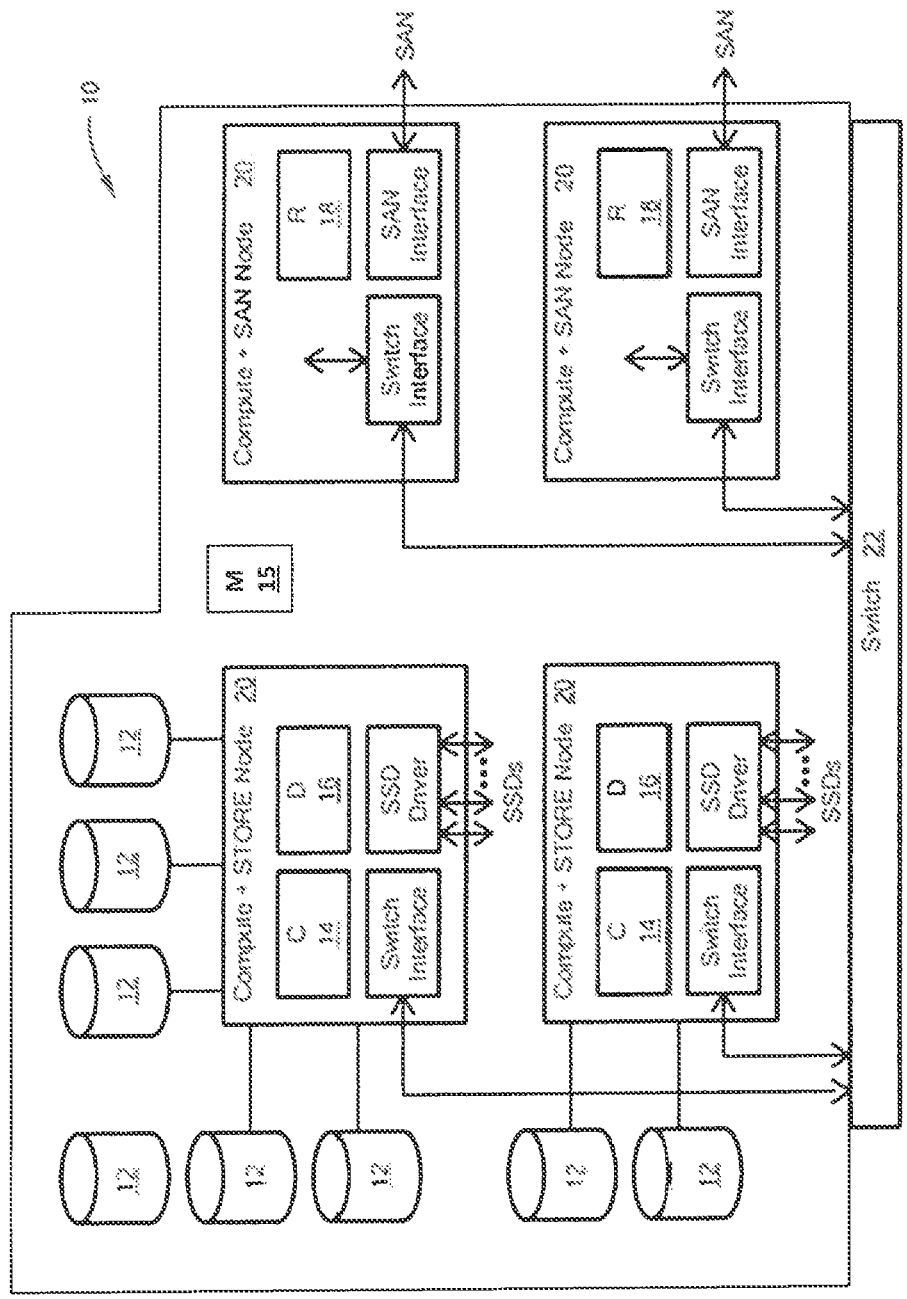
FIG. 1A is a simplified diagram schematically illustrating a distributed storage system for data storage, having separate control and data planes, in accordance with at least one illustrative embodiment of the disclosure.

Before describing embodiments of the concepts, structures, and techniques sought to be protected herein, some terms are explained, and some relevant background patents are referenced. The following description includes several terms for which the definitions are generally known in the art. However, the following glossary definitions are provided to clarify the subsequent description and may be helpful in understanding the specification and claims.

As used herein, the term "storage system" is intended to be broadly construed to encompass, for example, private or public cloud computing systems for storing data as well as systems for storing data comprising virtual infrastructure and those not comprising virtual infrastructure. As used herein, the terms "client," "host," and "user" refer, interchangeably, to any person, system, or other entity that uses a storage system to read/write data. In some embodiments, the term "storage device" may also refer to a storage array including multiple storage devices. In certain embodiments, a storage medium may refer to one or more storage mediums such as a hard drive, a combination of hard drives, flash storage, combinations of flash storage, combinations of hard drives, flash, and other storage devices, and other types and combinations of computer readable storage mediums including those yet to be conceived. A storage medium may also refer both physical and logical storage mediums and may include multiple level of virtual to physical mappings and may be or include an image or disk image. A storage medium may be computer-readable and may also be referred to herein as a computer-readable program medium.

In certain embodiments, the term "I/O request" or simply "I/O" or "IO" may be used to refer to an input or output request, such as a data read or data write request, which can originate at a host, at a user, or at any other entity in operable communication with a computer system.

In certain embodiments, a storage device may refer to any non-volatile memory (NVM) device, including hard disk drives (HDDs), solid state drivers (SSDs), flash devices (e.g., NAND flash devices), and similar devices that may be accessed locally and/or remotely (e.g., via a storage attached network (SAN) (also referred to herein as storage array network (SAN)).

In certain embodiments, a storage array (sometimes referred to as a disk array) may refer to a data storage system that is used for block-based, file-based or object storage, where storage arrays can include, for example, dedicated storage hardware that contains spinning hard disk drives (HDDs), solid-state disk drives, and/or all-flash drives (e.g., the XtremIO all flash drive, available from DELL/EMC of Hopkinton Mass.). In certain embodiments, a data storage entity may be any one or more of a file system, object storage, a virtualized device, a logical unit, a logical unit number, a logical volume, a logical device, a physical device, and/or a storage medium.

In certain embodiments, a logical unit (LU) may be a logical entity provided by a storage system for accessing data from the storage system, and as used herein a logical unit is used interchangeably with a logical volume. In many embodiments herein, a LU or LUN (logical unit number) may be used interchangeable for each other. In certain embodiments, a LUN may be a logical unit number for identifying a logical unit; may also refer to one or more virtual disks or virtual LUNs, which may correspond to one or more Virtual Machines. LUNs can be divided into smaller logical areas, to balance the load between system modules, where each such small logical area is called a sub-LUN.

In certain embodiments, a physical storage unit may be a physical entity, such as a disk or an array of disks, for storing data in storage locations that can be accessed by address, where physical storage unit is used interchangeably with physical volume. In certain embodiments, a data storage entity may be any one or more of a file system, object storage, a virtualized device, a logical unit, a logical unit number, a logical volume, a logical device, a physical device, and/or a storage medium.

In certain embodiments, data replication includes processes by which storage data (e.g., data stored on a data storage entity) is duplicated to a remote or local system, to help provide an enhanced level of redundancy in case a main or primary storage backup system fails. In certain embodiments, an image may be a copy of a logical storage unit at a specific point in time. In certain embodiments, a clone may be a copy or clone of the image or images, and/or drive or drives of a first location at a second location. In some embodiments, a clone may be made up of a set of objects.

In certain embodiments, a snapshot may refer to differential representations of an image, i.e. the snapshot may have pointers to the original volume and may point to log volumes for changed locations. In certain embodiments, a snapshot may refer to differential representations of the state of a system. Snapshots may be combined into a snapshot array, which may represent different images over a time period or different states of a system over a time period. In certain embodiments, snapshots may be taken from the original source address range as well as from previous snapshots acting as new sources. Snapshots can be arranged into a hierarchy such as a tree, in certain embodiments, with each respective snapshot considered to be a leaf of the tree. Alternately, snapshots can be arranged into a type of tree where there is a tree per snapshot. In another alternative, snapshots can be viewed as part of an array and viewed "by row" or "by column." With arrangement by row, the snapshots are arranged so that they are part of a tree of snapshots, where each leaf of the tree corresponds to another tree of addresses in that snapshot. With arrangement by column, snapshots can be arranged such that there is a tree of addresses, where each leaf contains a tree of snapshots which contain that address. In certain embodiments, a snapshot set consists of snapshots taken at the exact time on all volumes in a consistency group or, in other words, a snapshot on a consistency group.

In certain embodiments, a consistency group (CG) is a collection of base volumes in a storage array, where the base volumes that are the sources of snapshot images are referred to as member volumes of a consistency group. In certain embodiments, CGs are used to create a consistent image of a set of volumes, such as to create snapshots at both the production and the target locations. In certain embodiments, one purpose of a consistency group is to take simultaneous snapshot images of multiple volumes, thus ensuring crash-consistent (as opposed to application-consistent) copies of a collection of volumes at a particular point in time. In certain embodiments, where production volumes are written to target or copy volumes, a consistency group helps to ensure that all writes to the production volume(s) are also written to the copy(ies) in correct write-order and in consistent way, so the copy can always be used instead of production volume. For example, in some embodiments, a consistency group of data storage objects from different servers can be replicated across a network to one or more secondary servers; in the consistency group, file version objects from the different primary servers are kept consistent with each other even if applications or other user may access the original data storage object from more than one of the primary servers. In addition, the delta between successive snapshots of the consistency group can be created concurrently for data storage objects in different primary servers in such a way that the delta created at the different primary servers are consistent with each other even though an application may access the original data storage objects from more than one of the primary servers.

In certain embodiments, a journal may be a record of write transactions (e.g., I/O data) issued to a storage system, which may be used to maintain a duplicate storage system, and to roll back the duplicate storage system to a previous point in time. In some embodiments, each entry in a journal contains, apart from the I/O data itself, I/O metadata that can include information such as a volume identifier (ID), the I/O block offset within the volume, the I/O length, and a time stamp of the I/O.

In certain embodiments, a replication set may refer to an association created between a source or primary volume and a plurality of target volumes (which may be local or remote), where a consistency group may contain one or more replication sets. A consistency group can be journal protected, and in certain embodiments, all members of a consistency group can share a journal In certain embodiments, XtremIO, available from Dell EMC of Hopkinton, Mass.) is a type of content addressable storage array that uses all flash technology. Flash, as is understood, is a solid-state (SS) random access media type that can read any address range with no latency penalty, in comparison to a hard disk drive (HDD) which has physical moving components which require relocation when reading from different address ranges and thus significantly increasing the latency for random I/O data. In an exemplary Content Addressable Storage (CAS) array (e.g., as described in U.S. Pat. No. 9,208,162 (hereinafter "'162 patent"), which is hereby incorporated by reference), data is stored in blocks, for example of 4 KB, where each block has a unique large hash signature, for example of 20 bytes, saved on Flash memory. In certain embodiments, a long hash is a value computed based on a data packet, such as a SHA-1 hash that is 20 bytes in length, but this is not limiting. As described herein, hash signatures (also referred to herein as full hashes or long hashes) are accessed by small in-memory handles (Called herein, interchangeably, hash handles, short hash handles or short hashes)), for example of 6 bytes. These handles are unique to each array, but not necessarily unique across arrays. A hash signature is unique, meaning that if two hash signatures are the same then their corresponding data blocks are the same. In certain embodiments, a hash signature may be represented by a short hash generated by using, for example, processes shown in FIG. 12A of the '162 patent. Short hashes are not necessarily world-wide unique, but in certain embodiments short hashes can be unique within a domain. In certain embodiments, the long hash can be computed or determined based on the short hash, using, for example, processes shown in FIG. 12C of the '162 patent.

When replicating between two CAS arrays, it is much more efficient to use hash signatures instead of sending the full block. If the target already has the data block corresponding to the hash signature, there is no need to send the corresponding data. However, reading the hash signatures may be expensive, and is wasteful if the target does not have the data (in this case it can be faster to send the data without a hash signature, and let the target calculate the hash signature.) While the hash handles are readily available without the need to read from Flash, since the hash handles are not unique, they cannot be easily used to check if a target contains a hash signature. In some implementations, hash handles are shortcuts for hash signatures, and can give a reliable hint of the existence of a hash signature in an array.

In certain embodiments, an X-page is a predetermined-size aligned chunk as the base unit for memory and disk operations. In certain embodiments described in the present description, the X-Page size is referred to as having 4 KB; however other smaller or larger values can be used as well, and nothing in the design is limited to a specific value.

In certain embodiments, a logical X-page address is the logical address of an X-page, containing a LUN identifier as well as the offset of the X-page within the LUN.

In certain embodiments, deduplication of data is a technique that ensures that the same data is not intentionally stored twice in different places. Advantageously, using content-based mapping of data to data modules (D-modules) and within D-modules (as described further herein in connection with FIGS. 1A-1C) provides inherent deduplication.

In certain embodiments, asynchronous replication is a technique where, after a user or other entity writes data to the primary (also referred to as "source") storage array first, the asynchronous replication process commits data to be replicated to memory or a disk-based journal, including managing all the needed metadata for the replication process. It then copies the data at scheduled (e.g., periodic) intervals to replication targets. Some types of asynchronous replication can send I/Os in batches even while waiting for acknowledgement from a replication target that replication was successful. In contrast, with some types of synchronous replication, the synchronous replication process cannot continue serving I/Os until the target sends an acknowledgement for the I/Os already sent. Asynchronous replication can be advantageous for replication of data over long distances, to maintain a replica of the data at a destination site. Updates to the destination image can be issued manually, or automatically (e.g., at predetermined times) based on a customizable Recovery Point Objective (RPO) (e.g., the acceptable amount of data, measured in units of time, that may be lost in a failure).

In certain embodiments, a cluster is a system comprising two or more computers or systems (called nodes) which work together as a system, e.g., to execute applications or perform other tasks, so that entities that user or access them, have the impression that only a single system responds to them, thus creating an illusion of a single resource (virtual machine).

In certain embodiments, a recovery point objective (RPO) may refer to a maximum acceptable lag time between the time data is committed to a source site and the time the data is committed to a target site or an acceptable amount of data loss measured in time. The frequency with which to perform replication cycles may be determined by the RPO and/or a retention policy. For example, a policy may define an RPO setting of x seconds, where x may be a positive integer, to ensure that the most recent available replica stored on the target site reflects the state of data stored on source site no longer than x seconds ago.

It is envisioned that at least some embodiments described herein are usable with one or more of the embodiments described in certain commonly owned U.S. patents, and background information useful in understanding one or more embodiments described herein can be found in certain commonly owned U.S. patents, including but not limited to: U.S. Pat. No. 7,765,187 ("Replication of a Consistency Group of Data Storage Objects from Servers in a Data Network"); U.S. Pat. No. 9,104,326 ("Scalable Block Data Storage Using Content Addressing"); and U.S. Pat. No. 9,208,162 ("Generating a Short Hash Handle"), each of which patents are hereby incorporated by reference.

While vendor-specific terminology may be used herein to facilitate understanding, it is understood that the concepts, techniques, and structures sought to be protected herein are not limited to use with any specific commercial products. In addition, to ensure clarity in the disclosure, well-understood methods, procedures, circuits, components, and products are not described in detail herein.

The phrases, "such as," "for example," "e.g.," "exemplary," and variants thereof, are used herein to describe non-limiting embodiments and are used herein to mean "serving as an example, instance, or illustration." Any embodiments herein described via these phrases and/or variants are not necessarily to be construed as preferred or advantageous over other embodiments and/or to exclude the incorporation of features from other embodiments. In addition, the word "optionally" is used herein to mean that a feature or process, etc., is provided in some embodiments and not provided in other embodiments." Any particular embodiment may include a plurality of "optional" features unless such features conflict.

Before describing further aspects of various embodiments herein, one or more environments in which the embodiments can be implemented, are now described.

FIG. 1A illustrates a system 10 for scalable block data storage and retrieval using content addressing, which is usable in accordance with certain embodiments described herein. The system 10 includes data storage devices 12 on which the data blocks are stored. The storage devices 12 are networked to computing modules, there being several kinds of modules, including control modules 14 and data modules 16. The modules carry out content addressing for storage and retrieval under the control and supervision of a management module 15, and the network defines separate paths or planes, control paths or a control plane which goes via the control modules 14 and data paths or a data plane which goes via the data modules 16.

The control (C) modules 14 may control execution of read and write commands. The data (D) modules 16 are connected to the storage devices 20 and, under control of a respective control module, pass data to or from the storage devices. Both the C and D modules 14, 16, respectively, may retain extracts of the data stored in the storage device, and the extracts may be used for the content addressing. Typically, the extracts may be computed by cryptographic hashing of the data, as will be discussed in greater detail below, and hash modules (H) (FIG. 1B) may specifically be provided for this purpose. That is, the hash modules calculate hash values for data which is the subject of storage commands, and the hash values calculated may later be used for retrieval.

Routing modules 18 may terminate storage and retrieval operations and distribute command parts of any operations to control modules that are explicitly selected for the operation in such a way as to retain balanced usage within the system 10. The routing modules 18 may use hash values, calculated from data associated with the operations, to select the control module for the distribution. More particularly, selection of the control module may use hash values, but typically relies on the user address and not on the content (hash). The hash value is, however, typically used for selecting the Data (D) module 16, and for setting the physical location for data storage within a D module 16.

The storage devices 12 may be solid-state random-access storage devices, as opposed to spinning disk devices; however, disk devices may be used instead or in addition. A deduplication feature may be provided. The routing modules 18 and/or data modules 16 may compare the extracts or hash values of write data with hash values of already stored data, and where a match is found, simply point to the matched data and avoid rewriting. The modules are combined into nodes 20 on the network, and the nodes are connected over the network by a switch 22. The use of content addressing with multiple data modules selected based on the content hashing, and a finely grained mapping of user addresses to control modules, allows for a scalable distributed architecture.

Figure 1B:
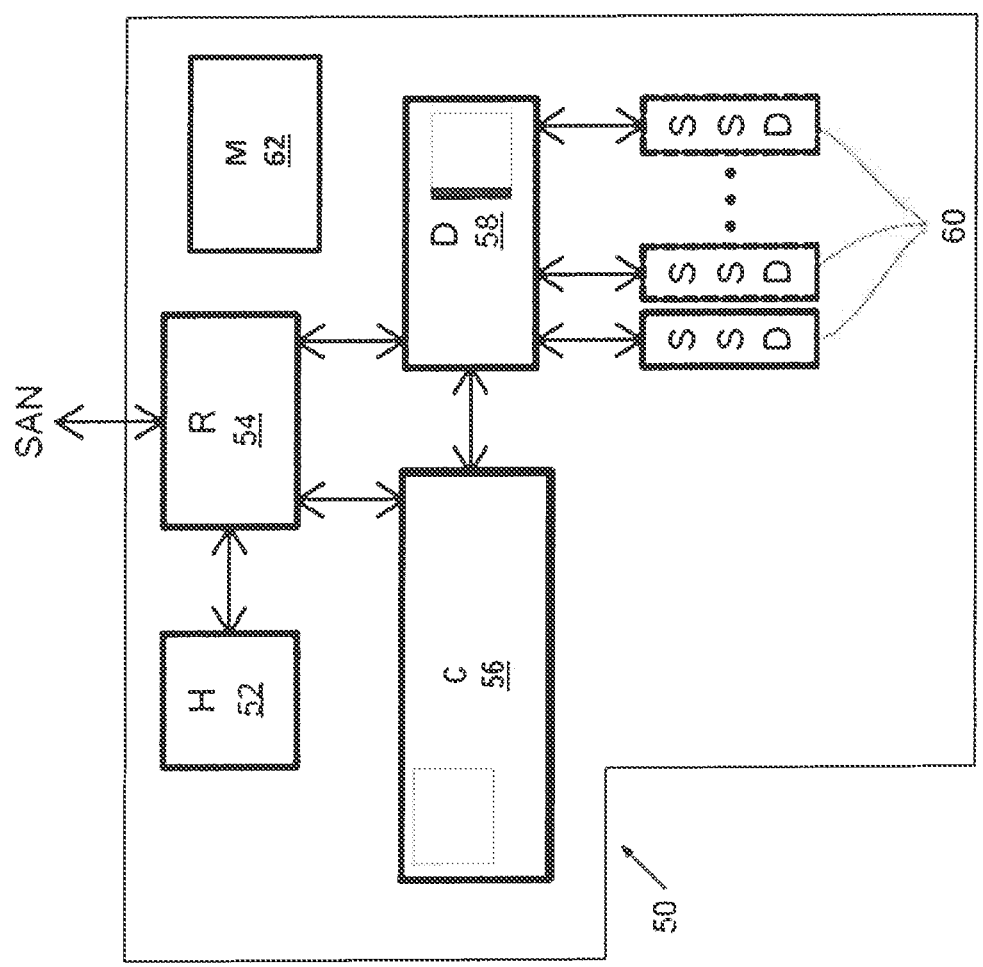
FIG. 1B is an exemplary configuration of modules for the distributed storage system of FIG. 1A, in accordance with at least one illustrative embodiment of the disclosure.

FIG. 1B is a functional block diagram of a system 50 in which a Hash (H) module 52 is connected to a routing (R) module 54. The R module 54 is connected to both control 56 and data 58 modules. The data module 58 is connected to any number of memory devices (e.g., solid-state devices (SSD)) 60. A management module 62 supervises the operations of the modules in the system 50.

A function of the H module 52 is to calculate the Hash function value for a given block of data, e.g., data which is the subject of storage commands. The hash values calculated may later be used for retrieval. The Hash function may be based on standards-based hash functions such as SHA-1 and MD5, or based on a proprietary function, but this is not limiting. The hash function is selected, in certain embodiments, to generate a uniformly distributed output over the range of potential input values. In certain embodiments, H modules 52 share nodes with an R module 54, but that is not limiting. More generally, the H modules 52 can reside in certain nodes, in all nodes, together with R modules 54, or together with C modules 56 or D modules 58.

A function of the R module 54 is to terminate storage area network (SAN) Read/Write commands and route them to appropriate C and D modules 56, 58, for execution by these modules. By doing so, the R module 54 can distribute workload over multiple C and D modules 56, 58, and at the same time create complete separation of the control and data planes, that is, provide separate control and data paths. In certain embodiments, the R module 54 routes SCSI I/O request to the C modules 56, guarantees execution, and returns the result. In certain embodiments, the R module 54 maintains an up to date data structure called an address-to-control module (A→C or A2C) table, coordinated with the management back end (MBD), indicating which C module 56 is responsible for each logical X-page address (LXA), and also showing a balance a range of all possible LXAs between available C modules 56. In certain embodiments, for write operations, the R module 54 instructs the calculation of a hash digest for each X-page by requesting such calculation from a hash calculation module (e.g., the H module 52).

A function of the C module 56 is to control the execution of a Read/Write (R/W) command, as well as other storage functions implemented by the system. The C module 56 also may maintain and manage key metadata elements. In certain embodiments, the C module 56 receives an I/O request from an R module 54 on a certain sub-LUN (SL), guaranteeing its atomic execution (i.e., execution independent of other processes) and returns the result to the R module 54. The C module 56 also communicates with D modules 58 to execute the I/O requests. In addition, the C module 56 monitors the disk content of its logical space by associating each LXA with its hash digest; and balances the work load between the D modules for the SLs that the C module 56 is maintaining. The C module 56 and data module 58 each maintains certain data structures and corresponding metadata journals for those data structures. For example, the C module 56 maintains an "address to hash" table (A2H table, also referred to herein as A-H table) and corresponding A2H metadata journal, in the C module 56. The D module 58 maintains the "hash to physical location of data" table (H2P table, also referred to herein as H→P table) and its corresponding metadata journal in the D module 58. That is, in certain embodiments, the in-memory copy of a journal is in the same module as the corresponding metadata table. In certain embodiments, the on-disk journal copy is persisted and mirrored across nodes in the cluster in journal disk chunks.

An A2H table maps each LXA that belongs to the SLs that the C module 56 is responsible for, to the hash digest representing the X-page Data that currently resides in that address. The C module 56 maintains the A2H table in a persistent way. The C module 56 may initiate requests to D modules 58 to save table pages to disk and read them from disk. In addition, to avoid frequent disk operations, the C module 56 maintains a journal certain of the latest table operations. These journals include (but are not limited to) the A2H metadata journals (A2H Hash tree) and dirty tree update metadata journals. As discussed below, the data module (D) takes charge of Hash Metadata (HMD), physical layout (PL) metadata, hash to physical layout (H2P) mapping, H2P metadata journals, on disk block allocation (3WBM) and disk block allocation bitmap (3WBM) journals, as discussed further herein. For example, in certain embodiments, the metadata journals include information associated with time-based changes to information in the respective A2H and H2P tables and time-based changes to the disk block allocation bitmap.

The H2P table maps each range of hash digests to the corresponding D module 58 responsible for that range. The H2P table balances the range of all possible hash digests between the available D modules 58.

A function of the D module 58 is to perform the actual R/W operation by accessing the storage devices 60 attached to it. The D module 58 may maintain metadata related with the physical location of data blocks. In certain embodiments, the D module 58 is responsible for: maintaining a set of LUNs which are attached locally and performing all I/O operations on these LUN; managing the physical layout of the attached LUNs; managing the mapping between X-Page Data hash digests and their physical location in a persistent way; managing deduplication of X-Page Data in a persistent way; and receiving disk I/O requests from C modules 56, perform them and returning a result.

In certain embodiments, the D module 58 is also responsible for, for each write operation, backing up the X-Page Data in the designated D backup module and performing read-modify operations for writes that are smaller than X-Page size (This process also involves, in certain embodiments, computing a hash digest for these X-Pages). In certain embodiments, the D module 58 maintains an up-to-date H→(D, $D_{backup}$) table coordinated with the MBE, where the H→(D, $D_{backup}$) table is expected to balance the range of all possible hash digests between the available D modules 58.

Balancing between the D modules is based on hashing of the content. For example, in certain embodiments, the D module 58 makes use of a hash digest metadata table. The hash digest metadata table maps each in use hash digest, that represents actual X-Page Data, to its meta data information including its physical page on the storage media (SSD), its memory copy (if exists), a mapping to any backup memory copy and a reference count for the purpose of deduplication. The D modules 58 manage a separate nonvolatile memory pool (NVRAM or UPS protected) for X-Page data backup purposes. The backup holds X-Pages that are held in memory of the D primary and have not yet been destaged. This is an example of the user data destage cache (UDC). There are dirty X-pages waiting to be persisted on disk. When re-balancing between D modules 58 occurs (due to a D module 58 failure for example), the D module 58 may communicate with other D modules 58 to create new backup copies or move a primary ownership as required.

The D modules 58 allow deduplication per X-Page data by maintaining a persistent reference count that guarantees only one copy per X-Page data. The D modules 58 manage the hash digest metadata table in a persistent way. The table is coordinated with the physical layout for physical pages allocation, with the memory pointer, memory backup pointer, and deduplication reference count.

As will be appreciated, the H, R, C, D, and M modules, respectively, 52, 54, 56, 62, and 58 may be implemented in software and executed on a physical node. In addition, the aforementioned U.S. Pat. No. 9,104,326 patent provides information relating to additional functionality of the R, C, D, and H modules, in certain embodiments.

FIG. 1C shows a storage system 100 according to an illustrative embodiment of the disclosure. The storage system 100 may be the same as or similar to a node 20 within the distributed storage system 10 of FIG. 1A and/or the system 50 of FIG. 1B. The storage system 100 may include a plurality of subsystems 102a-102d (generally denoted 102 herein), a storage array 106 comprising a plurality of storage devices 108a . . . 108n (generally denoted 108 herein), and a primary memory 118. In some embodiments, the storage devices 108 may be provided as random-access storage devices, such as solid-state devices (SSDs).

The primary memory 118 can be any type of memory having access times that are significantly faster compared to the storage devices 108. In some embodiments, primary memory 118 may be provided as dynamic random-access memory (DRAM). In certain embodiments, primary memory 118 may be provided as synchronous DRAM (SDRAM). In one embodiment, primary memory 118 may be provided as double data rate SDRAM (DDR SDRAM), such as DDR3 SDRAM.

In the embodiment shown, the subsystems 102 include a routing subsystem 102a, a control subsystem 102b, a data subsystem 102c, and a management subsystem 102d. The routing subsystem, control subsystem 102b, data subsystem 102c, and management subsystem 102d correspond to the R, C, D, and M modules shown in FIGS. 1A-1B. A single control subsystem and a single routing subsystem is shown in FIG. 1C for simplicity; however, it will be understood that multiple control subsystems and routing systems may be included in the system of FIG. 1C in order to realize the advantages of the embodiments described herein.

In one embodiment, subsystems 102 may be provided as software components, i.e., computer program code that, when executed on a processor, may cause a computer to perform functionality described herein. In a certain embodiment, the storage system 100 includes an operating system (OS) and one or more of the subsystems 102 may be provided as user space processes executable by the OS. In other embodiments, the subsystems 102 may be provided, at least in part, as hardware, such as digital signal processor (DSP) or an application specific integrated circuit (ASIC) configured to perform functionality described herein.

The routing subsystem 102a may be configured to receive I/O operations from clients 118 using, for example, an external application-programming interface (API) and to translate client I/O operations into internal commands. In some embodiments, the routing subsystem 102a is configured to receive commands from small computer system interface (SCSI) clients 118. In certain embodiments, the system 100 may store data in fixed-size chunks, for example 4K chunks, where each chunk may have a unique hash value (referred to herein as a "chunk hash," which in certain embodiments is the same as a hash digest). In such embodiments, the routing subsystem 102a may be configured to split data into fixed-size chunks and to calculate the corresponding chunk hashes. In one embodiment, chunk hashes are calculated using Secure Hash Algorithm 1 (SHA-1) processing. In some embodiments, a chunk corresponds to a fixed number of contiguous blocks within a storage device.

The control subsystem 102b may be configured to maintain a mapping between I/O addresses associated with data and the corresponding chunk hashes. As shown in FIG. 1C, this mapping may be maintained using a data structure 112, referred to herein as an "I/O address to chunk hash mapping table" or "A2H table," (also known as A→H table) according to some embodiments. In one embodiment, I/O addresses may be logical addresses used by clients 118 to access data within the storage system 100.

The data subsystem 102c may be configured to maintain a mapping between chunk hashes and physical storage addresses (i.e., storage locations within the storage array 106 and/or within individual storage devices 108). This mapping may be maintained using a data structure 114, referred to herein as a "hash to physical address mapping table" or "H2P table," or "H→P table," according to some embodiments, where this table, in certain embodiments, includes information similar to that of the aforementioned HMD (hash metadata) and PL (physical layout) tables. In certain embodiments, as described, for example, in the incorporated by reference patents, there also may be a mapping referred to as the H2D or H→D table, where D stands for disk physical layout. In certain embodiments, the H2P table is maintained to route data with different hashes to different D modules. The data subsystem 102c may be also be configured to read and write data from/to the storage array 106 (and/or to individual storage devices 108 therein).

It will be appreciated that combinations of the A2H 112 and H2P 114 tables may provide multiple levels of indirection between the logical (or "I/O") address a client 118 uses to access data and the physical address where that data is stored. Among other advantages, this can give the storage system 100 freedom to move data within the storage array 106 without affecting a client's 118 access to that data (e.g., if a storage device 108 fails).

The management subsystem 102d (also referred to herein as system manager or SYM) may be configured to monitor and track the status of various hardware and software resources within the storage system 100. In some embodiments, the management subsystem 102d may manage the allocation of memory by other subsystems (e.g., subsystems 102a-102c) using techniques described below in conjunction with FIGS. 2-10, described further herein. In some embodiments, the management subsystem 102d can also be configured to monitor other subsystems 102 (e.g., subsystems 102a-102c) and to use this information to determine when the storage system 100 may begin processing client I/O operations after a restart.

In certain embodiments, the system 100 enables control of the usage of bandwidth during asynchronous replication for a destination storage. The management subsystem 102d maintains a remote system object 120 with a predetermined maximum bandwidth limit value that is permitted for all replication sessions for a destination storage system (e.g., target/remote storage). The management subsystem 102d also maintains a data structure 130 that stores a list of routing modules subject to the bandwidth limit, a maximum amount of bandwidth per corresponding link, and a corresponding identifier of the destination storage system (e.g., a globally unique identifier—GUID).

In addition, the control subsystem 102b maintains a data structure 122 (also referred to as budget byte window per routing module) that provides a value specifying the control module's allocated share of the bandwidth limit. The control subsystem 102b also includes a data structure 124 that provides a value indicating whether the control module is subject to the bandwidth limit process. For example, the data structure 124 may represent a flag that lets the system know whether the destination storage system is under the bandwidth limit. In addition, the control subsystem 102b also includes a data structure 126 that provides the maximum allocated bandwidth per link under the control of the control module and the identifier of the destination storage system. Finally, the control subsystem 102b includes a data structure 128 that provides a slice bitmap usable during the bandwidth control processes. These above-referenced elements of the management subsystem and control subsystem are described further herein.

Figure 2:
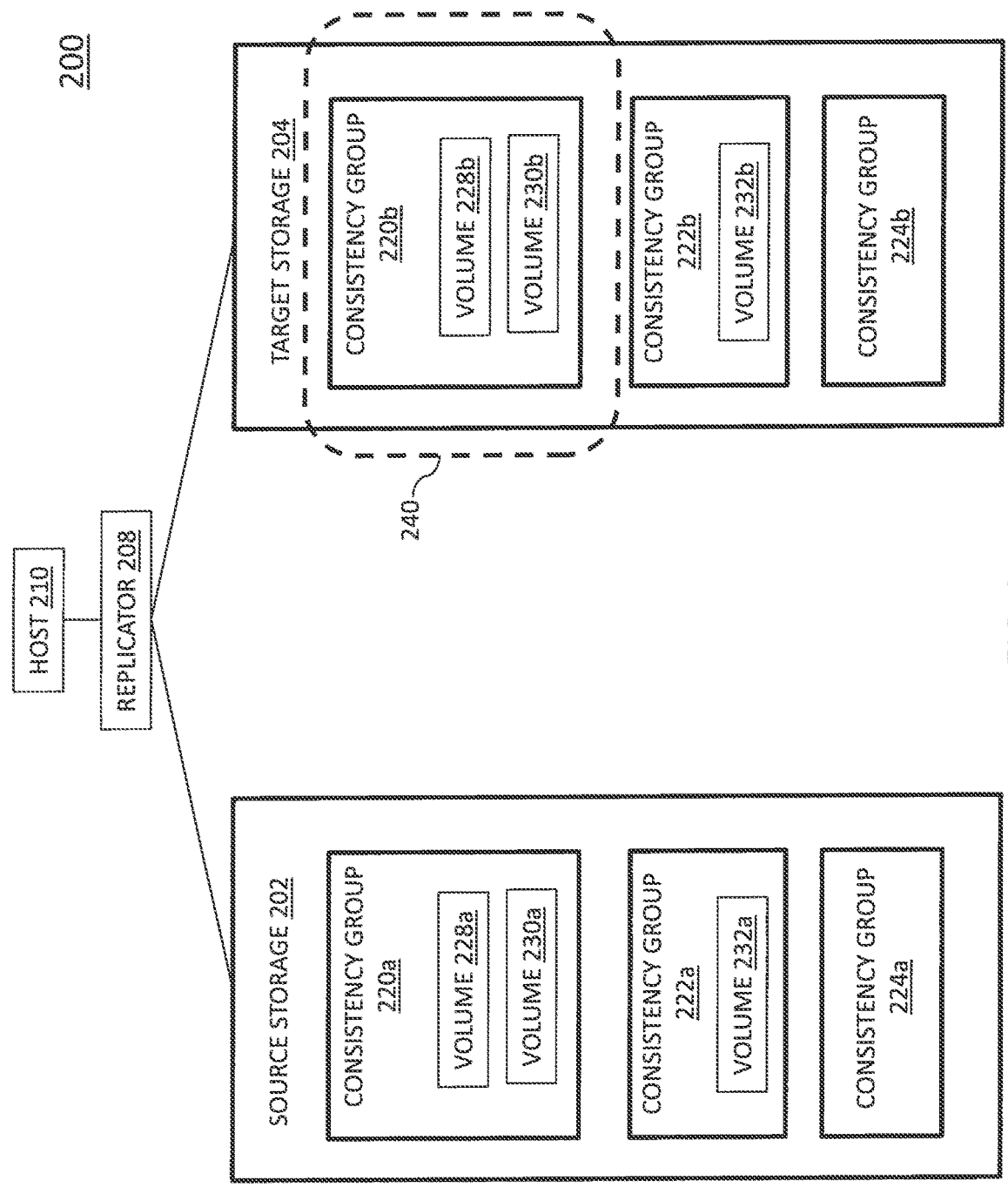
FIG. 2 is a simplified block diagram of a replication system, in accordance with one illustrative embodiment of the disclosure.

FIG. 2 is a simplified block diagram of an exemplary replication system 200, in accordance with one illustrative embodiment of the disclosure, which may be implemented using the system 10 of FIG. 1A. The system 200 includes a host 210, a replicator module 208, a source storage module 202 (e.g., a storage array) on a source side and a target storage module 204 (e.g., a storage array), on a target side, which are advantageously in operable communication over a network (not shown). The host 210 may include an application (not shown) that writes to the source storage 202. The replicator module 208 ensures that all the writes made to the source storage 202 are also eventually made to the target storage device 204. The replicator module 208 may reside outside the storage arrays 202 and 204, or it may be inside one of them, or it may be in an independent system, or it may be inside the host 210.

The source storage 202 includes consistency groups (e.g., a consistency group 220a, a consistency group 222a and a consistency group 224a) and the target storage device 204 also includes respective consistency groups (e.g., for target 204 a consistency group 220b, a consistency group 222b, and a consistency group 224b). The consistency group 220a includes volumes (e.g., a volume 228a and a volume 230a) and the consistency group 220b includes volumes (e.g., volumes 228b and 230b). The consistency group 222a includes a volume 232a and the consistency group 222b includes volume 232b. In certain embodiments, the storage volumes 228b, 230b, 232b, are replicas of the respective consistency groups 220a, 222a on the source storage side. In certain embodiments, the target storage modules 204 can include one or more target clusters, e.g., target cluster 240.

The system 200 also can, for example, be similar to the storage system 100 of FIG. 1C. The source storage 202 can be located at a production site and the target storage system 204 can be located at a replication site. Although the system 200 shows a plurality of consistency groups 220, 222, 224 at the source side, at least some systems 200 can have a single consistency group (e.g., consistency group 220a) that is replicated to a target cluster (e.g., target cluster 240). In certain embodiments, one or more of the source side consistency groups are replicated asynchronously to target storage device.

In certain embodiments, the consistency group 220a and the consistency group 220b (in each respective target cluster) may form first and second replication pairs, where the consistency group 220a is replicated asynchronously to the consistency group 220b. The consistency group 222a and the consistency group 222b also form a replication pair wherein the consistency group 222a is replicated asynchronously to the consistency group 222b. It will be appreciated that, in certain embodiments, a replication set can include, for example, two or more elements (e.g., a primary, such as consistency group 220a, and a target, e.g., 220b).

In certain embodiments, the volumes for consistency group 220a and the consistency group 220b form volume pairs, so that each volume in consistency group 220a corresponds to exactly one volume in consistency group 220b. That is, the volume 228a is paired with the volume 228b and the volume 230a is paired with the volume 230b. In particular, in certain embodiments, the volume 228a is replicated at the volume 228b and the volume 230a is replicated at the volume 230b. In one example, a replication pair includes information on the volume pairs and the replication, and fully describes a replication instance between a source storage and a target storage.

Referring still to FIG. 2, in one example, one or more of the storage volumes on the source side and the target side are each on a respective disk. For example, in one embodiment, the storage volumes 228a and 230a in consistency group 220a is on a first respective flash memory device and is configured for replication to replicate to target cluster 240, which is on a flash memory device. Thus, in an illustrative replication configuration, in accordance with certain embodiments herein, a single consistency group (CG) is replicated into a target cluster. In the asynchronous replication case, this can be done by taking snapshots, calculating differences (deltas) between snapshot generations, and rebuilding the snapshots on targets. Examples of how snapshots and deltas between snapshots are created and used in exemplary replication and storage systems are described, for example, in U.S. Pat. No. 7,764,187, which is hereby incorporated by reference. In certain embodiments, for systems such as those shown in FIG. 2, asynchronous replication is advantageous for primary storage (e.g., including a consistency group (CG)) that is replicated to targets at a greater distance.

Figure 3:
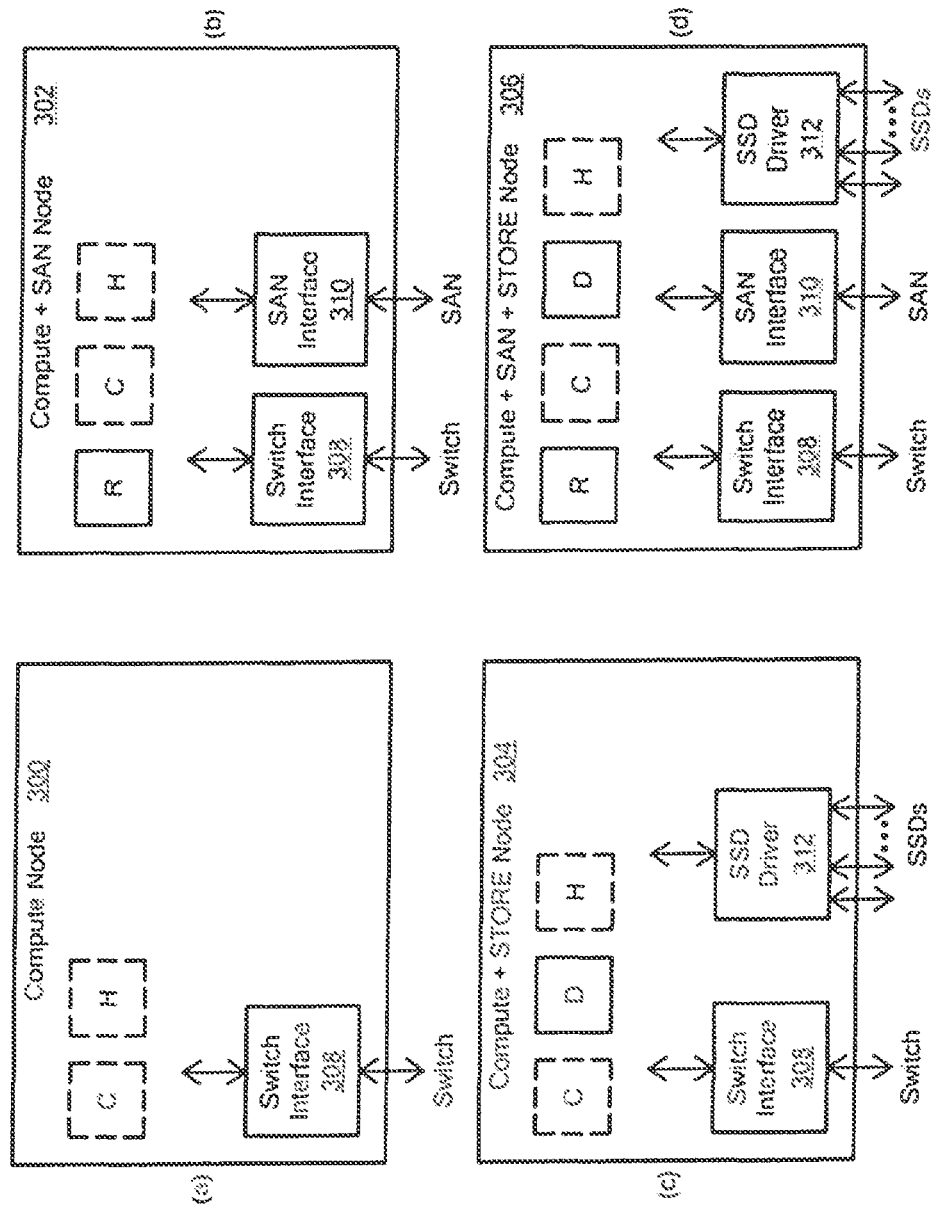
FIG. 3 is a simplified diagram schematically illustrating four different node configurations for a replication system, in accordance with one illustrative embodiment.

FIG. 3 is a simplified diagram schematically illustrating four different node configurations for a replication system usable with at least some embodiments herein, in accordance with one illustrative embodiment. In FIG. 3 each node type shows the functional modules that execute, in at least one copy, within the node, and functional modules that may optionally execute within this node. Optional modules are shown in dashed line.

All nodes include a switch interface 308, to allow interconnecting with a switch (see FIG. 4) in a multi-node system configuration. A node that contains a SAN function includes at least one SAN Interface module 310 and at least one R nodule. A bode that contains a Store function includes at least one SSD driver module 312 and at least one D module. Hence, in certain embodiments, Compute+SAN and Compute+SAN+STORE nodes contain a SAN interface, to interface with the external SAN. The interface may typically use a SCSI-based protocol running on any of a number of interfaces including Fiber Channel, Ethernet, and others, through which read/write and other storage function commands are being sent to the system. Compute+Store and Compute+SAN+Store Nodes contain an SSD driver 312 to interface with SSDs 208 attached to that specific node, where data is stored and accessed.

Figure 4:
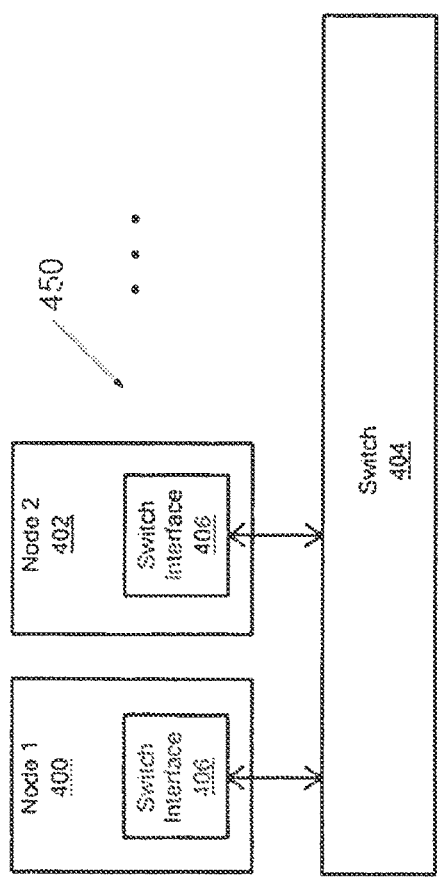
FIG. 4 is a simplified schematic diagram showing the nodes of FIG. 3 connected to a switch.

FIG. 4 is a simplified schematic diagram 450 showing the nodes of FIG. 3 connected to a switch, in a high-level system block diagram. A system implementation includes one or more nodes 400, 402. In certain embodiments where a system contains more than two nodes, all physical nodes are interconnected by a switch 404 which may be based on any of a number of networking technologies including Ethernet, InfiniBand and so forth. In the specific case of a 2-node system, the two nodes can be interconnected directly without a need for a switch. The interconnections between each node and the switch may include redundancy, to achieve high system availability with no single point of failure. In such a case, each node may contain two or more switch interface modules 406, and the switch may contain two or more ports per physical node.

Figure 5:
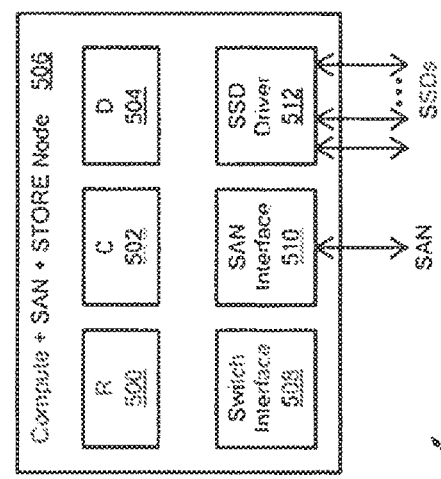
FIG. 5 is a simplified diagram showing a compute+SAN+ store node for the device of FIGS. 1A-1C and 2.

FIG. 5 is a simplified diagram 550 showing a compute+SAN+store node for the device of FIGS. 1A-4. In particular, FIG. 5 illustrates a single node system configuration, in which R, C and D modules, 500, 502 and 504 respectively are together in a compute+SAN+Store node 506. A switch interface 508 links to a switch. A SAN interface 510 provides an interface for storage area networking. An SSD driver 512 interfaces with the storage devices.

A four-node system configuration is shown in FIGS. 1A and 3 above. The configuration includes two compute and store nodes and two compute+SAN nodes. A system that is built from multiple physical nodes can inherently support a high availability construction, where there is no single point of failure. This means that any node or sub-node failure can be compensated for by redundant nodes, having a complete copy of the system's metadata, and a complete redundant copy of stored data (or parity information allowing recovery of stored data). The distributed and flexible architecture allows for seamless support of failure conditions by simply directing actions to alternate nodes.

The R module is responsible for routing SCSI I/O requests to the C modules, guarantee execution and return the result; and balancing the work load between the C modules for the requests it is routing. An A→C table indicates which C module is responsible for each logical X-page address (LXA). Each C module is responsible for a list of Sub LUNs (SLs). The R module receives requests for I/O's from the SAN interface routes them to the designated C modules and returns the result to the SAN interface.

If an I/O operation spans across multiple sub LUNs (SLs), and perhaps multiple C modules, then the R module has the responsibility of breaking the big I/O operation into multiple smaller independent operations according to the sub LUN unit size (SLUS). Since the atomic unit size (AUS) is never larger than the SLUS, as explained in greater detail below, each such I/O is treated as an independent operation throughout the system. The results may then be aggregated before returning to the SAN interface. The R module is responsible for maintaining an up-to-date A→C table coordinated with the MBE. The A→C table is expected to balance the range of all possible LXAs between the available C modules. For write operations, the R module instructs the calculation of the hash digest for each X-Page by requesting such calculation from a hash calculation module.

The C module is responsible for: receiving an I/O request from an R module on a certain SL, guaranteeing its atomic execution and returning the result; communicating with D modules to execute the I/O requests; monitoring the disk content of its SLs' logical space by associating each LXA with its hash digest; and balancing the work load between the D modules for the SLs it is maintaining.

An H→D table maps each range of hash digests to the corresponding D module responsible for this range. An A→H table maps each LXA that belongs to the SLs C is responsible for, to the hash digest representing the X-Page data that currently resides in this address. The C module receives I/O requests from R modules, distributes the work to the D modules, aggregates the results and guarantees an atomic operation. The result is returned to the R module. The C module maintains an up-to-date H→D table coordinated with the MBE. The table is expected to balance the range of all possible hash digests between the available D modules.

The C module maintains an A-H table in a persistent way. The C module may initiate I/O requests to D modules to save table pages to disk and read them from disk. To avoid frequent disk operations, a journal of the latest table operations may be maintained. Data is balanced between the C modules based on the logical address, at the granularity of sub-LUNs.

The D module is responsible for: maintaining a set of LUNs which are attached locally and performing all I/O operations on these LUNs; managing the physical layout of the attached LUNs; managing the mapping between X-Page data hash digests and their physical location in a persistent way; managing deduplication of X-Page data in a persistent way; and receiving disk I/O requests from C modules, perform them and returning a result. The D module is also responsible for, for each write operation, backing up the X-Page data in the designated D backup module and performing read-modify operations for writes that are smaller than X-Page size (This process also involves computing a hash digest for these X-Pages). The D module is further responsible for maintaining an up-to-date H→(D, $D_{backup}$) table coordinated with the MBE. The H→(D, $D_{backup}$) table is expected to balance the range of all possible hash digests between the available D modules. The D module does not communicate directly with R modules. The only interaction with R modules involves RDMA read/write operations of X-Page data. Balancing between the D modules is based on hashing of the content. The D module makes use of a hash digest metadata table. The hash digest metadata table maps each in use hash digest, that represents actual X-Page data, to its metadata information including its physical page on the storage media (SSD), its memory copy (if exists), a mapping to any backup memory copy and a reference count for the purpose of deduplication.

A further structure used is the H→(D, $D_{backup}$) table. The H→(D, $D_{backup}$) table maps each range of hash digests to the corresponding D module responsible for the range as well as the $D_{backup}$ module responsible for the range. The D modules allocate a physical page for each X-Page. The D modules also manage the memory for the physical storage. They allocate memory pages for read/write operations and perform background destaging from memory to storage media when necessary, for example, when running low on memory. The D modules manage a separate nonvolatile memory pool (NVRAM or UPS protected) for X-Page data backup purposes. The backup holds X-Pages that are held in memory of the D primary and have not yet been destaged. When re-balancing between D modules occur (due to a D module failure for example), the D module may communicate with other D modules to create new backup copies or move a primary ownership as required.

The D modules allow deduplication per X-Page data by maintaining a persistent reference count that guarantees only one copy per X-Page data. The D modules manage the hash digest metadata table in a persistent way. The table is coordinated with the physical layout for physical pages allocation, with the memory pointer, memory backup pointer and deduplication reference count. The D modules receive I/O requests from C modules, perform the requests while supporting deduplication and return the result. The D modules may perform RDMA read/write operations on memory that resides in other modules, such as R modules as mentioned above, as part of the I/O operation. When a write operation smaller than the size of an X-Page is received, the D module may read the entire X-Page to memory and perform partial X-Page modification on that memory. In this case race conditions may occur, for example when two small writes to the same X-Page occur in parallel, and the D module may be required to compute the hash digest of the resulting X-Page. This is discussed in greater detail below.

The H-Module calculates the hash function of a given block of data, effectively mapping an input value to a unique output value. The hash function may be based on standards-based hash functions such as SHA-1 and MD5 or based on a proprietary function. The hash function is selected to generate a uniformly distributed output over the range of potential input values. The H modules usually share nodes with an R module but more generally, the H modules can reside in certain nodes, in all nodes, together with R modules, or together with C or D modules.

FIGS. 6-9 are simplified flowcharts of a method of implementing bandwidth control on asynchronous replication sessions for a particular destination storage system, in accordance with at least one disclosed embodiment, which method is usable, for example, with the systems of FIGS. 1C and 2 and in connection with FIGS. 6-9. The bandwidth limit is imposed on all replication sessions corresponding to a predetermined destination storage system (e.g., target/remote storage 204 of FIG. 2).

Figure 6:
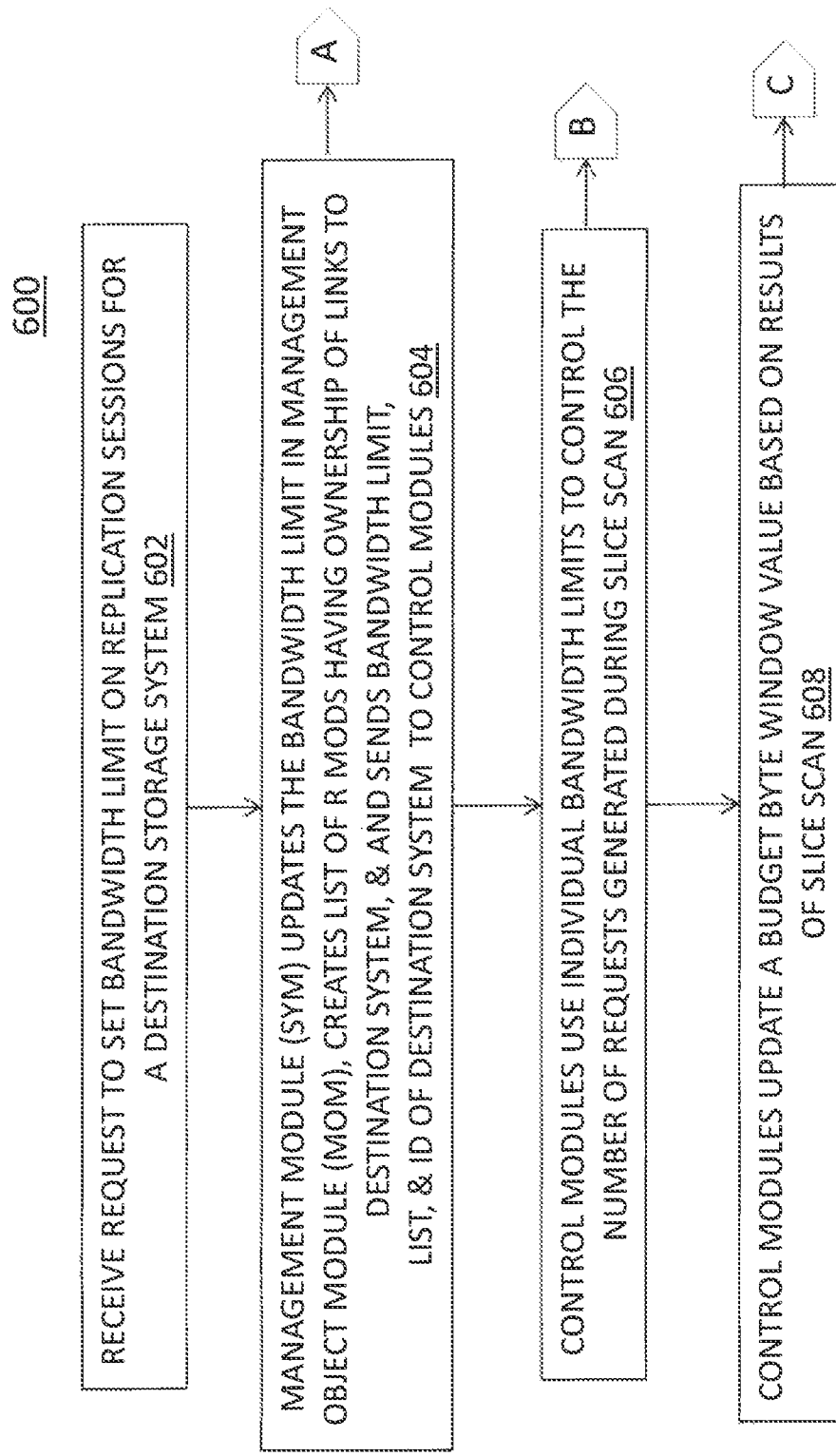
FIG. 6 is a simplified flowchart of a process for implementing bandwidth usage limits on asynchronous replication sessions for a destination storage system, in accordance with at least one disclosed embodiment.

Referring to FIGS. 1C, 2, and 6-9, the system receives a request to set a bandwidth limit (also referred to as a maximum bandwidth limit) on the remote system for all replication sessions between the two storage systems (e.g., source 202 and target 204 of FIG. 2) in block 602 of process 600 in FIG. 6. The bandwidth limit reflects a total maximum bandwidth permitted for sessions associated with the remote system (e.g., all of the sessions cannot consume more bandwidth than what is set for the particular destination system). This request can be a user-tunable parameter and may be implemented, e.g., using an 'add-max-bw-limit' command at the storage system, e.g., in an external management system such as XMS, which may be a virtual or physical machine that manages the system. The bandwidth limit may be specified as megabytes per second (MB/s). A zero value entered by a user indicates that no bandwidth limit on the destination system is desired. The external management system sends the bandwidth limit and the identifier of the remote system to the system manager (e.g., SYM 102*d* of FIG. 1C). The command takes two parameters: the maximum bandwidth associated with the request and the name or identifier (e.g., index/GUID) of the remote system.

In block 604, a system manager of the storage system updates a remote system object 120 in a management object module (MOM)(not shown) with a value representing this bandwidth limit and creates a list of routing modules that have ownership of each of the internet protocol (IP) links going to the remote system and the maximum limit per link in MB/s (e.g., maximum limit set by the user dived by number of links to remote system). This value is stored in the data structure 132 of FIG. 1C. The MOM may reside in the management module 102*d* of FIG. 1C. The system manager sends the value representing the maximum bandwidth limit per link, the list of routing modules, and the destination identifier to each of the control modules of the storage system. The control modules, in turn, process this information as described in FIG. 7. The identifier of the remote system enables the system to extend features to support multiple links per port going to different remote devices. In addition, when a link goes up or down, the system manager recalculates the maximum bandwidth limit per link and sends the updated list of routing modules having uplinks to the remote system along with the recalculated bandwidth value to the control modules.

In block 606, each of the control modules uses an apportioned share of the bandwidth limit to control the number of requests generated during a slice scan. The slice scan process is described further in FIG. 8.

In block 608, each of the control modules updates a budget byte window 122 value based on results of slice scan. This update process is described further in FIG. 9.

Figure 7:
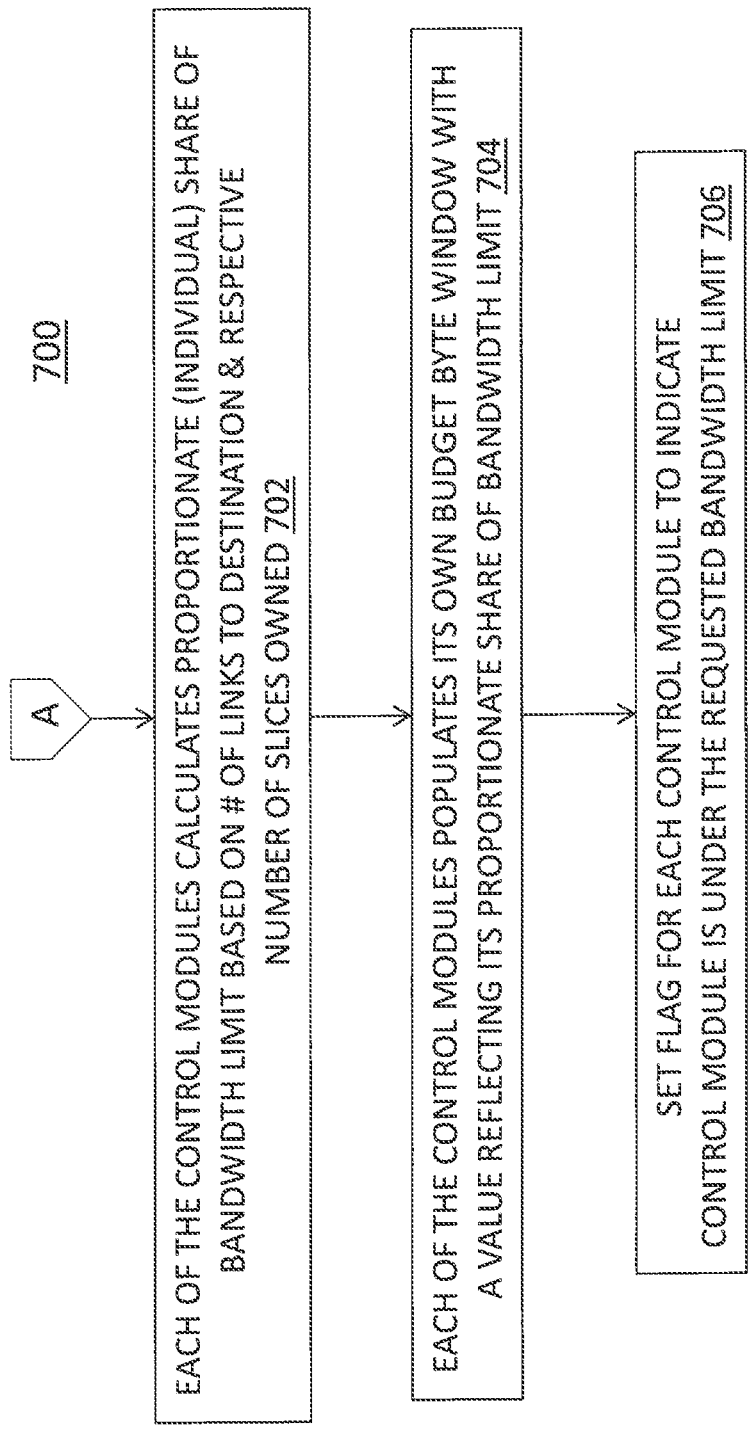
FIG. 7 is simplified flowchart of a process for updating a bandwidth limit, in accordance with one embodiment.

Turning to FIG. 7, once the system manager sends the maximum bandwidth limit per link, list of routing modules, and the destination identifier to the control modules, each of the control modules calculates a proportionate (individual) share of the bandwidth limit based on a number of slices owned by each of the control modules via process 700 of FIG. 7. In other words, each control module calculates its own share of the bandwidth limit that it can generate based on the number of slices it owns. The proportionate share of the bandwidth limit for each of the control modules may be calculated by dividing the value representing the bandwidth limit per link by the total number of control modules of the storage system. For example, if the maximum bandwidth limit for the replication session is 200 MB/s and there are four links, each link gets 50 MB/s bandwidth. If there are a total of four control modules each of which owns 256 slices then each control module will at most generate 12.5 MB/s per link. In an embodiment, the budget byte window for a routing module may be represented as a page size multiplied by the 256 slices. In a further embodiment, the budget byte window reflects a maximum number of address/hash pairs for a control-to-routing (C2R) task. A C2R task refers to messages transmitted between control modules and routing modules. For example, a message can list the addresses and hashes that a routing module needs to send to a target system. C2R tasks and responses transmitted between the control module and the routing module are shown generally in FIG. 1C at 130.

In the control module, the granularity of the budget byte window 122 may be represented in bytes/msec.

In block 704, each of the control modules populates its own budget byte window per routing module 122 with a value (referred to as budget value) reflecting its proportionate share of the total bandwidth limit per destination per routing module indicating how much budget each routing module is allowed measured in bytes/msec. The GUID in the control module differentiates cases where there are two links going through the same routing module to different remote systems having different limits. This can be flagged (e.g., via flag 124 of FIG. 1C) to indicate if it is under the maximum bandwidth limit.

In block 706, the replication session object structure 124 is flagged for each control module to indicate whether the control module is subject to the maximum bandwidth limit process. This may be, e.g., a True/False value. If the flag is not set, then there is no need to use the budget byte window during the scanning process to prevent other sessions not under the limit from waiting on or applying the budget byte window.

Figure 8:
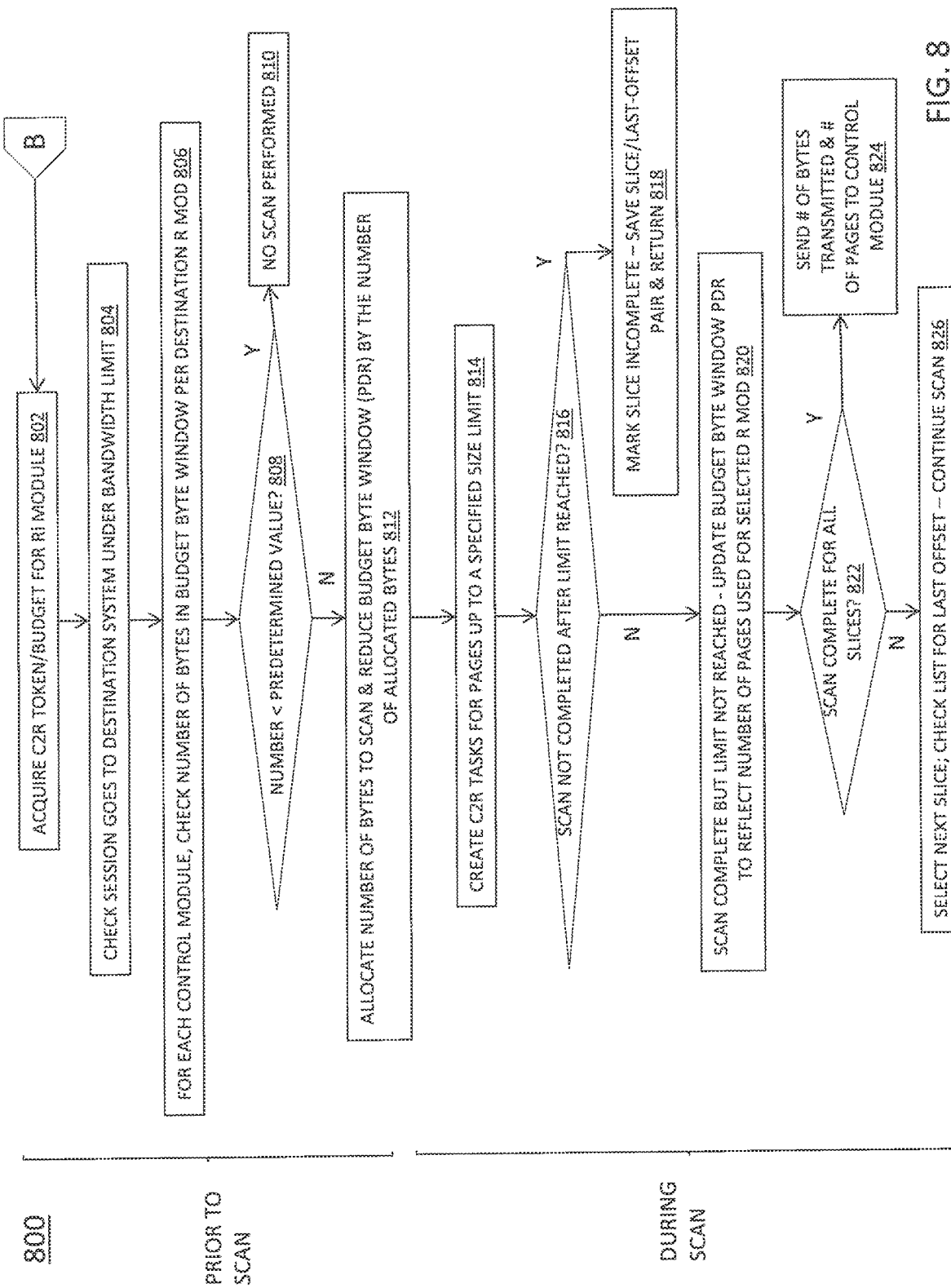
FIG. 8 is a simplified flowchart of a process for limiting the number of requests generated during a slice scan, in accordance with one embodiment.
Figure 9:
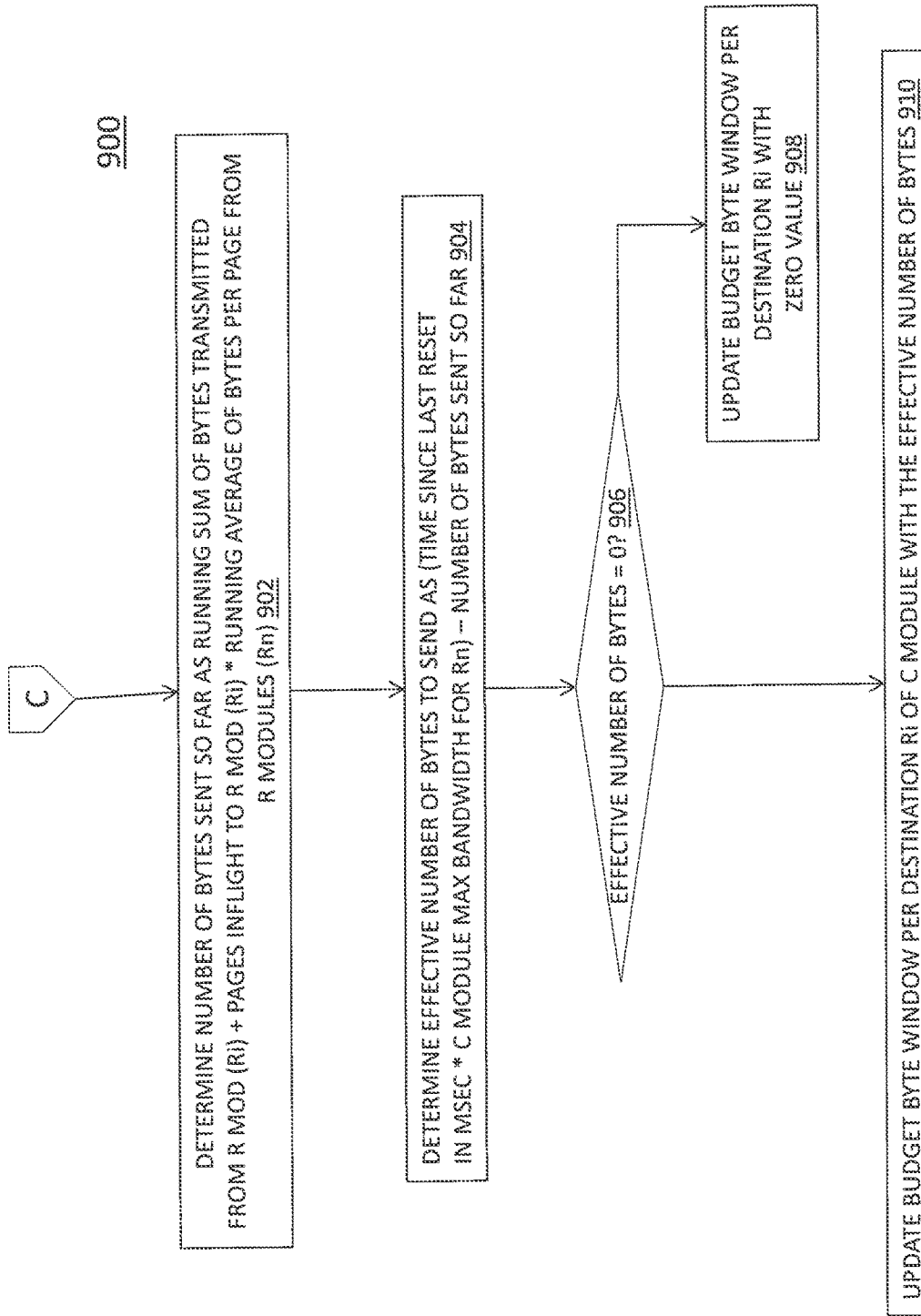
FIG. 9 is a simplified flowchart of a process for updating a budget byte window, in accordance with one embodiment.

As indicated above in block 606 of FIG. 6, the control modules use the bandwidth limit to control the number of requests generating during a slice scan. FIG. 8 describes this process 800.

In block 802, prior to initiating a scan of the slices for a control module by an initiator thread, the system acquires a control-to-routing (C2R) token for a selected routing module (Ri) that has an uplink to the destination storage system under the imposed budget limit. The system acquires the C2R token simultaneously with the budget limit for the routing module in order to ensure the data is sent through the same routing module for which a budget has been taken.

In block 804, the system checks to see if the session corresponds to the remote system under the bandwidth limit. Assuming the session corresponds to the remote system under the limit, the system checks the number of bytes in the budget byte window in block 806. In block 808, the system determines whether the number of bytes in the budget byte window for the routing module (Ri) subject to the token is less than a predetermined value. For example, the predetermined value may be set as a page size*256 pages, which is the maximum number of address/hash pairs one C2R task can have.

In block 810, if the budget byte window is less than the predetermined value (e.g., page size*256), the iterator thread does not proceed. In other words, in block 810, no scan is performed for the control module. Each control module performs the scan of slices it owns independent of other control modules. When the iterator thread does not proceed, this is because the particular control module waits to start the scan until it has enough bytes in the budget byte window. Other control modules may or may not proceed depending upon how much budge they have.

If the number of bytes in the budget byte window for the selected routing module Ri is equal to or exceeds the predetermined value, the process allocates the number of bytes (budget value) to the initiator thread for scanning and reduces the budget byte window by the number of allocated bytes in block 812. For example, the budget byte window is reduced by 256*page size under spinlock. If the RP is also under individual bandwidth limit, the replication session object is checked to see if it has individual budget to proceed (e.g., 256 pages) with the scan. If not, the budget taken is returned to the budget byte window for the destination routing module and associated token. If there is enough individual budget, the individual budget is taken. If the replication session is under bandwidth limit based on remote system and also under limit for individual session, we check if enough individual budget is available to proceed. If not, we return the remote system budget is returned and C2R token taken. If there is enough budget for the session, it is taken and the process proceeds.

During the slice scan, the routing module Ri may initiate the initiator thread for slices corresponding to the budget byte window. The initiator thread starts the slice scan.

In block 814, C2R tasks may be created for pages up to a specified size limit. For example, during the scan C2R tasks are created for pages up to 256.

If the slice scan is not completed after the specified limit has been reached (256 pages) in block 816, the slice is marked as not done, or incomplete, in block 818 and the slice/last-offset pair is saved in the bitmap 128 and returns (e.g., the control module will stop the scan until it has enough budget to begin again). If the control module finds more than 256 pages to be transferred to a target in one slice, it cannot finish the scan of that slice. The control module will thus save the slice number and last address pair to identify where to start the next time.

In block 820, if the scan has completed before the specified limit (e.g., 256 pages) has been reached, the budget byte window is updated to reflect the number of pages used for the selected routing module Ri. For example, if routing module R-12 is selected and 100 pages were used, then 256−100=156*page size is added to the budget byte window per destination routing module (R-12).

When the iterator thread returns to check for more work, instead of relaying a slice cursor, the slice bitmap 128 may be checked to determine if all the slices have been scanned.

In block 822, the process determines (e.g., from the bitmap) whether the scan has completed for all slices for the control module. If so, the routing module sends the number of bytes transmitted and the number of pages used to the control module in block 824.

However, in block 826, if the scan has not completed for all slices of the control module, the next slice is selected for scanning. A list in the bitmap 128 is checked for the last offset and the scan continues.

After completing the processing of the C2R task, the routing module sends the number of bytes transmitted and number of pages back to the control modules in a C2R response 130.

As indicated above in block 608 of FIG. 6, the process updates the budget byte window per destination routing module (Ri) via the control module. The flow diagram 900 of FIG. 9 further describes this process.

Upon completion of the scanning of all of the control modules, the corresponding budget byte window per destination routing module (Ri) for each of the plurality of control modules is updated. In block 902, the process determines a number of bytes currently sent during the replication session as a running sum of bytes transmitted from the routing module (Ri) plus pages inflight to Ri multiplied by a running average of bytes per page from the routing modules Rn (running sum of bytes transmitted from routing module Ri+pages inflight to Ri*running average of bytes per page from all routing modules Rn).

In block 904, the process determines an effective number of bytes to send as: time elapsed since a last reset in milliseconds multiplied by the control module budget value for Rn in bytes/msec minus the number of bytes currently sent ((time since last reset in msec*control module max bandwidth for Rn in bytes per msec)−number of bytes currently sent);

In block 906, if effective number of bytes is equal to zero, the budget byte window per destination Ri is updated with a zero value in block 908. If the effective number of bytes is greater than zero, the budget byte window per destination Ri is updated with the effective number of bytes in block 910. The updated budget byte window per destination Ri is used by the scan process to determine whether sufficient budget exists to send a selected C2R task to a respective routing module (Ri).

In embodiments, all of the dynamic parameters (e.g., budget byte window, bytes transmitted, bytes per page, etc.) may be reset at frequent intervals (e.g., every minute). This can be useful, e.g., in situations where host write patterns change (e.g., data can become more compressible or less, more deduplicated or less, etc.), so the bytes-per-page can change at any time. This may also be useful in situations where there are network glitches that won't affect the budget byte window calculation beyond a minute. This can be particularly important in case the cycles are very long, e.g., in hours.

In embodiments, the control module maximum bandwidth may not be changed unless a user explicitly sets a new bandwidth limit or there is a redistribution of slices. If some of the links are down, the system may attempt to use the other links with available bandwidth. If some routing modules have links with impairments or have lower bandwidth than others, then C2R tokens for these routing modules won't be available as fast as others and will end up using faster links to transfer the data.

In the above-described flow charts of FIGS. 6-9, rectangular elements, herein denoted "processing blocks," represent computer software instructions or groups of instructions. Alternatively, the processing blocks may represent steps performed by functionally equivalent circuits such as a digital signal processor (DSP) circuit or an application specific integrated circuit (ASIC). The flow diagrams do not depict the syntax of any particular programming language but rather illustrate the functional information one of ordinary skill in the art requires to fabricate circuits or to generate computer software to perform the processing required of the particular apparatus. It should be noted that many routine program elements, such as initialization of loops and variables and the use of temporary variables may be omitted for clarity. The particular sequence of blocks described is illustrative only and can be varied without departing from the spirit of the concepts, structures, and techniques sought to be protected herein. Thus, unless otherwise stated, the blocks described below are unordered meaning that, when possible, the functions represented by the blocks can be performed in any convenient or desirable order.

Further, the processes and operations described herein can be performed by a computer especially configured for the desired purpose or by a general-purpose computer especially configured for the desired purpose by another computer program stored in a computer readable storage medium or in memory.

Figure 10:
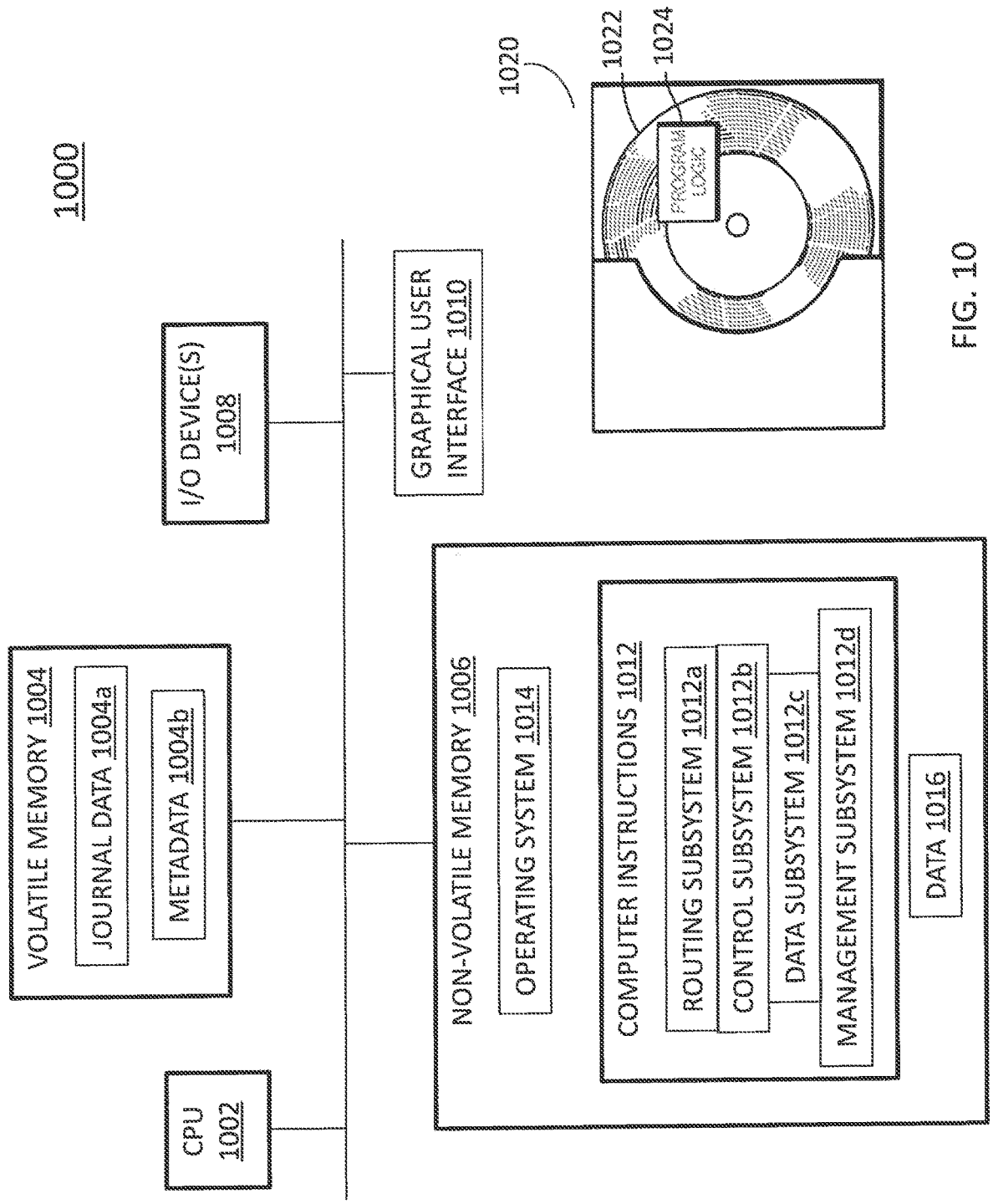
FIG. 10 is a simplified block diagram of an apparatus that may be used to implement at least a portion of the systems and processes of FIGS. 1A-9, in accordance with at least some embodiments.

FIG. 10 is a simplified block diagram of an apparatus that may be used to implement at least a portion of the systems and method of FIGS. 1A-9B, in accordance with at least some embodiments. As shown in FIG. 10, computer 1000 may include processor 1002, volatile memory 1004 (e.g., RAM), non-volatile memory 1006 (e.g., one or more hard disk drives (HDDs), one or more solid state drives (SSDs) such as a flash drive, one or more hybrid magnetic and solid state drives, and/or one or more virtual storage volumes, such as a cloud storage, or a combination of physical storage volumes and virtual storage volumes), graphical user interface (GUI) 1010 (e.g., a touchscreen, a display, and so forth) and input and/or output (I/O) device 1008 (e.g., a mouse, a keyboard, etc.). Non-volatile memory 1004 stores, e.g., journal data 1004a and metadata 1004b. The non-volatile memory, 1006 can include, in some embodiments, an operating system 1014, and computer instructions 1012, and data 1016. In certain embodiments, the computer instructions 1012 are configured to provide several subsystems, including a routing subsystem 1012A, a control subsystem 1012b, a data subsystem 1012c, and a management subsystem 1012d. In certain embodiments, the computer instructions 1012 are executed by the processor/CPU 1002 out of volatile memory 1004 to perform at least a portion of the processes shown in FIGS. 6-9. Program code also may be applied to data entered using an input device or GUI 1010 or received from I/O device 1008.

The systems and processes of FIGS. 1A-9 are not limited to use with the hardware and software described and illustrated herein and may find applicability in any computing or processing environment and with any type of machine or set of machines that may be capable of running a computer program. The processes described herein may be implemented in hardware, software, or a combination of the two. The logic for carrying out the method may be embodied as part of the system described in FIG. 10, which is useful for carrying out a method described with reference to embodiments shown in, for example, FIGS. 1A-9. The processes and systems described herein are not limited to the specific embodiments described. For example, the processes of FIGS. 6-9 are not limited to the specific processing order shown. Rather, any of the blocks of the processes may be re-ordered, combined, or removed, performed in parallel or in serial, as necessary, to achieve the results set forth herein.

Processor 1002 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs). In some embodiments, the "processor" may be embodied in one or more microprocessors with associated program memory. In some embodiments, the "processor" may be embodied in one or more discrete electronic circuits. The "processor" may be analog, digital, or mixed-signal. In some embodiments, the "processor" may be one or more physical processors or one or more "virtual" (e.g., remotely located or "cloud") processors.

Various functions of circuit elements may also be implemented as processing blocks in a software program. Such software may be employed in, for example, one or more digital signal processors, microcontrollers, or general-purpose computers. Described embodiments may be implemented in hardware, a combination of hardware and software, software, or software in execution by one or more physical or virtual processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid-state memory, non-volatile memory, volatile memory, and so forth, but does not include a transitory signal per se. When embodied in a non-transitory machine-readable medium and the program code is loaded into and executed by a machine, such as a computer, the machine becomes an apparatus for practicing the method.

When implemented on one or more processing devices, the program code segments combine with the processor to provide a unique device that operates analogously to specific logic circuits. Such processing devices may include, for example, a general-purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of one or more of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

For example, when the program code is loaded into and executed by a machine, such as the computer of FIG. 10, the machine becomes an apparatus for practicing the invention. When implemented on one or more general-purpose processors, the program code combines with such a processor to provide a unique apparatus that operates analogously to specific logic circuits. As such a general-purpose digital machine can be transformed into a special purpose digital machine. FIG. 10 shows Program Logic 1024 embodied on a computer-readable medium 1020 as shown, and wherein the Logic is encoded in computer-executable code configured for carrying out the reservation service process of this invention and thereby forming a Computer Program Product 1022. The logic may be the same logic on memory loaded on processor. The program logic may also be embodied in software modules, as modules, or as hardware modules. A processor may be a virtual processor or a physical processor. Logic may be distributed across several processors or virtual processors to execute the logic.

In some embodiments, a storage medium may be a physical or logical device. In some embodiments, a storage medium may consist of physical or logical devices. In some embodiments, a storage medium may be mapped across multiple physical and/or logical devices. In some embodiments, storage medium may exist in a virtualized environment. In some embodiments, a processor may be a virtual or physical embodiment. In some embodiments, logic may be executed across one or more physical or virtual processors.

For purposes of illustrating the present embodiment, the disclosed embodiments are described as embodied in a specific configuration and using special logical arrangements, but one skilled in the art will appreciate that the device is not limited to the specific configuration but rather only by the claims included with this specification. In addition, it is expected that during the life of a patent maturing from this application, many relevant technologies will be developed, and the scopes of the corresponding terms are intended to include all such new technologies a priori.

The terms "comprises," "comprising", "includes", "including", "having" and their conjugates at least mean "including but not limited to". As used herein, the singular form "a," "an" and "the" includes plural references unless the context clearly dictates otherwise. Various elements, which are described in the context of a single embodiment, may also be provided separately r in any suitable subcombination. It will be further understood that various changes in the details, materials, and arrangements of the parts that have been described and illustrated herein may be made by those skilled in the art without departing from the scope of the following claims.

We claim:

1. A method for implementing bandwidth control on asynchronous replication sessions for a destination storage system, the method comprising:

receiving a request to set a bandwidth limit on replication sessions for the destination storage system;

updating, by a system manager of the destination storage system, a remote system object with a value representing the bandwidth limit;

creating a list of routing modules having ownership of each of a plurality of links going to the destination storage system;

sending, by the system manager, a value representing a maximum bandwidth per link to each of a plurality of control modules of the storage system;

calculating, by each of the control modules, a proportionate share of the bandwidth limit based on a number of slices owned by each of the control modules, the proportionate share of the bandwidth limit calculated by dividing the maximum bandwidth limit per link by a number of the plurality of control modules, the proportionate share of the bandwidth limit indicated by a budget value in a budget byte window for each of the routing modules corresponding to a respective control module;

prior to initiating a scan of the slices by an initiator thread with respect to a selected routing module, identifying a corresponding budget byte window having a budget value equal to or exceeding a predetermined value, allocating the budget value for the budget byte window to the initiator thread, and reducing the budget value corresponding to the budget byte window by the predetermined value;

initiating, by the routing module, the initiator thread for slices corresponding to the identified budget byte window, the initiator thread scanning the slices;

sending, by the routing module, values representing a number of bytes transmitted and corresponding number of pages to the respective control module resulting from the scanning; and updating, by the control module, the corresponding budget byte window based on the values sent by the routing module.

2. The method of claim 1, further comprising:
suppressing scanning, by the initiator thread, of slices corresponding to the control module identified with a budget byte window having a budget value that is less than the predetermined value.

3. The method of claim 1, wherein the request to set the bandwidth limit includes a maximum amount of bandwidth to be used for replication sessions occurring at the destination storage system and a unique identifier of the destination storage system.

4. The method of claim 1, wherein each of the plurality of control modules manages 256 slices of storage devices in the storage system and the budget byte window is represented as a page size multiplied by the 256 slices.

5. The method of claim 4, wherein the budget byte window reflects a maximum number of address/hash pairs for a control-to-routing task between a control module and a routing module.

6. The method of claim 1, further comprising:
during the scanning of one of the slices, creating control-to-routing tasks for pages up to a specified size limit;
if the scanning is not completed after the specified size limit is reached, marking the one of the slices as incomplete, saving the one of the slices and a last-offset pair in a corresponding bitmap; and
if the scanning is completed but the specified size limit is not reached, updating a corresponding budget byte window for the routing module to reflect a number of pages used.

7. The method of claim 1, further comprising:
upon completion of the scanning of each of the plurality of control modules, updating corresponding budget byte windows for corresponding routing modules, the updating comprising:
for each of the plurality of control modules:
determining a number of bytes currently sent during the replication session as a running sum of bytes transmitted from routing modules plus pages inflight to the routing modules multiplied by a running average of bytes per page from the routing modules; and
determining an effective number of bytes to send as a time since a last reset in milliseconds multiplied by the budget value minus the number of bytes currently sent;
wherein the updating the corresponding budget byte window comprises updating the budget byte window with the effective number of bytes to send;
wherein an updated budget byte window is used to determine whether sufficient budget exists to send a selected control-to-routing task to a respective routing module.

8. A system for implementing bandwidth control on asynchronous replication sessions for a destination storage system, comprising;
a memory comprising computer-executable instructions; and
a processor executing the computer-executable instructions, the computer-executable instructions when executed by the processor cause the processor to perform operations comprising:
receiving a request to set a bandwidth limit on replication sessions for the destination storage system;
updating, by a system manager of the destination storage system, a remote system object with a value representing the bandwidth limit;
creating a list of routing modules having ownership of each of a plurality of links going to the destination storage system;
sending, by the system manager, a value representing a maximum bandwidth per link to each of a plurality of control modules of the storage system;
calculating, by each of the control modules, a proportionate share of the bandwidth limit based on a number of slices owned by each of the control modules, the proportionate share of the bandwidth limit calculated by dividing the maximum bandwidth limit per link by a number of the plurality of control modules, the proportionate share of the bandwidth limit indicated by a budget value in a budget byte window for each of the routing modules corresponding to a respective control module;
prior to initiating a scan of the slices by an initiator thread with respect to a selected routing module, identifying a corresponding budget byte window having a budget value equal to or exceeding a predetermined value, allocating the budget value for the budget byte window to the initiator thread, and reducing the budget value corresponding to the budget byte window by the predetermined value;
initiating, by the routing module, the initiator thread for slices corresponding to the identified budget byte window, the initiator thread scanning the slices;
sending, by the routing module, values representing a number of bytes transmitted and corresponding number of pages to the respective control module resulting from the scanning; and
updating, by the control module, the corresponding budget byte window based on the values sent by the routing module.

9. The system of claim 8, wherein the operations further comprise:
suppressing scanning, by the initiator thread, of slices corresponding to the control module identified with a budget byte window having a budget value that is less than the predetermined value.

10. The system of claim 8, wherein the request to set the bandwidth limit includes a maximum amount of bandwidth to be used for replication sessions occurring at the destination storage system and a unique identifier of the destination storage system.

11. The system of claim 8, wherein each of the plurality of control modules manages 256 slices of storage devices in the storage system and the budget byte window is represented as a page size multiplied by the 256 slices.

12. The system of claim 11, wherein the budget byte window reflects a maximum number of address/hash pairs for a control-to-routing task between a control module and a routing module.

13. The system of claim 8, wherein the operations further comprise:
during the scanning of one of the slices, creating control-to-routing tasks for pages up to a specified size limit;
if the scanning is not completed after the specified size limit is reached, marking the one of the slices as incomplete, saving the one of the slices and a last-offset pair in a corresponding bitmap; and
if the scanning is completed but the specified size limit is not reached, updating a corresponding budget byte window for the routing module to reflect a number of pages used.

14. The system of claim 8, wherein the operations further comprise:
upon completion of the scanning of each of the plurality of control modules, updating corresponding budget byte windows for corresponding routing modules, the updating comprising:
for each of the plurality of control modules:
determining a number of bytes currently sent during the replication session as a running sum of bytes transmitted from routing modules plus pages inflight to the routing modules multiplied by a running average of bytes per page from the routing modules; and
determining an effective number of bytes to send as a time since a last reset in milliseconds multiplied by the budget value minus the number of bytes currently sent;
wherein the updating the corresponding budget byte window comprises updating the budget byte window with the effective number of bytes to send;
wherein an updated budget byte window is used to determine whether sufficient budget exists to send a selected control-to-routing task to a respective routing module.

15. A computer program product for implementing bandwidth control on asynchronous replication sessions for a destination storage system, the computer program product embodied on a non-transitory computer readable storage medium, and the computer program product including instructions that, when executed by a computer causes the computer to perform operations, the operations comprising:
receiving a request to set a bandwidth limit on replication sessions for the destination storage system;
updating, by a system manager of the destination storage system, a remote system object with a value representing the bandwidth limit;
creating a list of routing modules having ownership of each of a plurality of links going to the destination storage system;
sending, by the system manager, a value representing a maximum bandwidth per link to each of a plurality of control modules of the storage system;
calculating, by each of the control modules, a proportionate share of the bandwidth limit based on a number of slices owned by each of the control modules, the proportionate share of the bandwidth limit calculated by dividing the maximum bandwidth limit per link by a number of the plurality of control modules, the proportionate share of the bandwidth limit indicated by a budget value in a budget byte window for each of the routing modules corresponding to a respective control module;
prior to initiating a scan of the slices by an initiator thread with respect to a selected routing module, identifying a corresponding budget byte window having a budget value equal to or exceeding a predetermined value, allocating the budget value for the budget byte window to the initiator thread, and reducing the budget value corresponding to the budget byte window by the predetermined value;
initiating, by the routing module, the initiator thread for slices corresponding to the identified budget byte window, the initiator thread scanning the slices;
sending, by the routing module, values representing a number of bytes transmitted and corresponding number of pages to the respective control module resulting from the scanning; and
updating, by the control module, the corresponding budget byte window based on the values sent by the routing module.

16. The computer program product of claim 15, wherein the operations further comprise:
suppressing scanning, by the initiator thread, of slices corresponding to the control module identified with a budget byte window having a budget value that is less than the predetermined value.

17. The computer program product of claim 15, wherein the request to set the bandwidth limit includes a maximum amount of bandwidth to be used for replication sessions occurring at the destination storage system and a unique identifier of the destination storage system.

18. The computer program product of claim 15, wherein each of the plurality of control modules manages 256 slices of storage devices in the storage system and the budget byte window is represented as a page size multiplied by the 256 slices; and
wherein the budget byte window reflects a maximum number of address/hash pairs for a control-to-routing task between a control module and a routing module.

19. The computer program product of claim 15, wherein the operations further include:
during the scanning of one of the slices, creating control-to-routing tasks for pages up to a specified size limit;
if the scanning is not completed after the specified size limit is reached, marking the one of the slices as incomplete, saving the one of the slices and a last-offset pair in a corresponding bitmap; and
if the scanning is completed but the specified size limit is not reached, updating a corresponding budget byte window for the routing module to reflect a number of pages used.

20. The computer program product of claim 15, wherein the operations further comprise:
upon completion of the scanning of each of the plurality of control modules, updating corresponding budget byte windows for corresponding routing modules, the updating comprising:
for each of the plurality of control modules:
determining a number of bytes currently sent during the replication session as a running sum of bytes transmitted from routing modules plus pages inflight to the routing modules multiplied by a running average of bytes per page from the routing modules; and
determining an effective number of bytes to send as a time since a last reset in milliseconds multiplied by the budget value minus the number of bytes currently sent;
wherein the updating the corresponding budget byte window comprises updating the budget byte window with the effective number of bytes to send;

wherein an updated budget byte window is used to determine whether sufficient budget exists to send a selected control-to-routing task to a respective routing module.

* * * * *